(12) United States Patent
Brooks

(10) Patent No.: US 8,424,571 B2
(45) Date of Patent: *Apr. 23, 2013

(54) REPAIR SYSTEM AND METHOD

(76) Inventor: Carl M. Brooks, Caldwell, ID (US)

( * ) Notice: Subject to any disclaimer, the term of this patent is extended or adjusted under 35 U.S.C. 154(b) by 51 days.

This patent is subject to a terminal disclaimer.

(21) Appl. No.: 13/103,684

(22) Filed: May 9, 2011

(65) Prior Publication Data

US 2011/0203694 A1    Aug. 25, 2011

Related U.S. Application Data

(63) Continuation-in-part of application No. 12/368,106, filed on Feb. 9, 2009, now Pat. No. 7,938,146.

(60) Provisional application No. 61/027,200, filed on Feb. 8, 2008, provisional application No. 61/103,631, filed on Oct. 8, 2008.

(51) Int. Cl.
*F16L 55/16* (2006.01)

(52) U.S. Cl.
USPC ............................................. 138/99; 138/97

(58) Field of Classification Search .............. 138/98, 138/97, DIG. 1, 99; 156/53
See application file for complete search history.

(56) References Cited

U.S. PATENT DOCUMENTS

| | | | |
|---|---|---|---|
| 2,795,523 A * | 6/1957 | Cobb et al. ...................... 156/94 |
| 2,924,546 A * | 2/1960 | Shaw .............................. 156/94 |
| 4,023,831 A | 5/1977 | Thompson |
| 4,287,999 A * | 9/1981 | Heisterberg .................. 220/222 |
| 4,357,961 A | 11/1982 | Chick |
| 4,386,796 A | 6/1983 | Lyall et al. |
| 4,552,183 A * | 11/1985 | Chick .............................. 138/99 |
| 4,603,893 A * | 8/1986 | Takahashi ..................... 285/342 |
| 4,756,337 A * | 7/1988 | Settineri ......................... 138/99 |
| 4,894,521 A * | 1/1990 | Evans ............................ 219/535 |
| 5,020,572 A * | 6/1991 | Hunt .............................. 138/99 |
| 5,254,824 A | 10/1993 | Chamberlain et al. |
| 5,288,108 A * | 2/1994 | Eskew et al. .................... 285/15 |
| 5,341,554 A * | 8/1994 | Diperstein ................. 29/402.17 |
| 5,613,807 A | 3/1997 | Reber et al. |
| 5,632,307 A * | 5/1997 | Fawley et al. .................. 138/99 |
| 5,732,743 A | 3/1998 | Livesay |
| 5,814,387 A * | 9/1998 | Orihara et al. ................. 428/63 |
| 6,217,688 B1 | 4/2001 | Landers |
| 6,276,401 B1 * | 8/2001 | Wilson ......................... 138/172 |
| 6,386,236 B1 | 5/2002 | Buckley |
| 2006/0065320 A1 * | 3/2006 | Borland et al. ................ 138/99 |
| 2008/0017263 A1 * | 1/2008 | Robinson et al. .............. 138/99 |

\* cited by examiner

*Primary Examiner* — Patrick F Brinson
(74) *Attorney, Agent, or Firm* — Dwayne E. Rogge; Schacht Law Office, Inc.

(57) ABSTRACT

Disclosed herein is a repair apparatus and method for pipe and fittings. In one form, the method relates to utilizing fabric-like material which is intermixed with an adhesive. In one form, the adhesive is a two-part adhesive which hardens to a semi-rigid state to avoid stress fractures through repeated expansion and contraction due to physical movement or temperature variation in the pipe and/or fittings. In one form the method and apparatus are particularly useful in thermoplastic pipes. In other forms, the method is particularly useful in metal pipes and fittings, or in non-pipe structures.

3 Claims, 19 Drawing Sheets

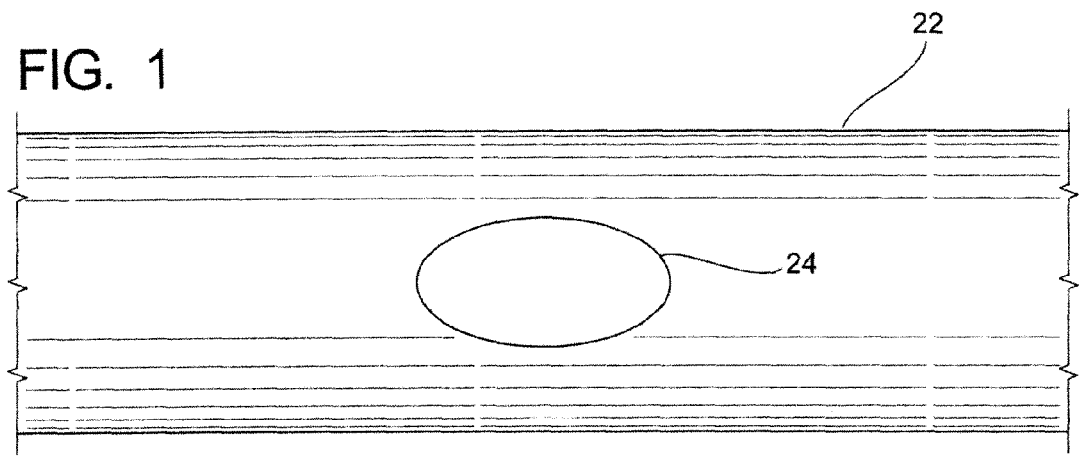
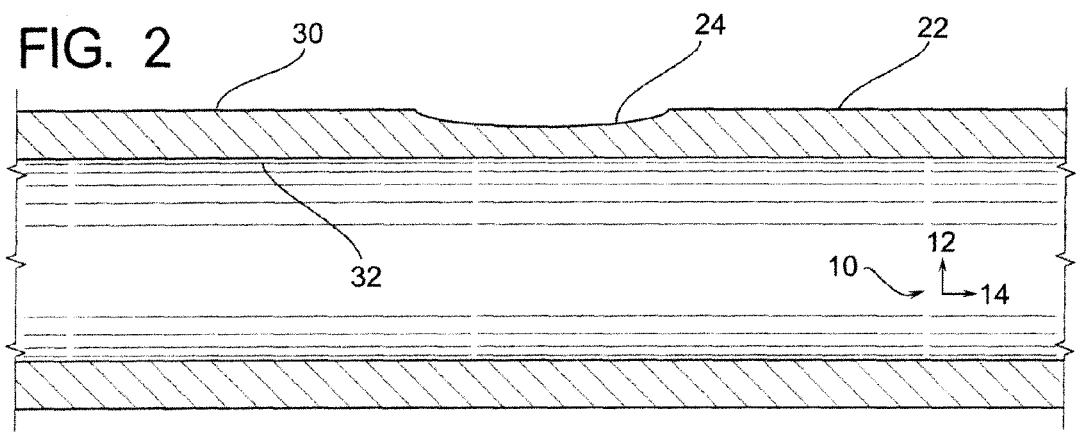

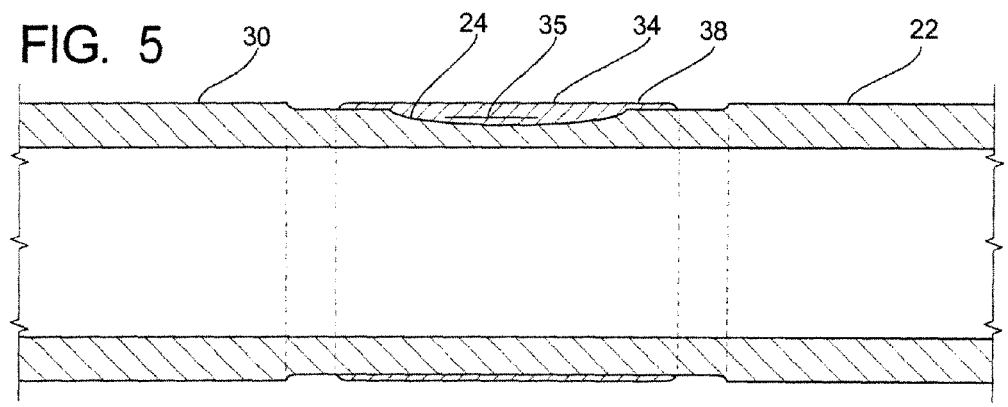
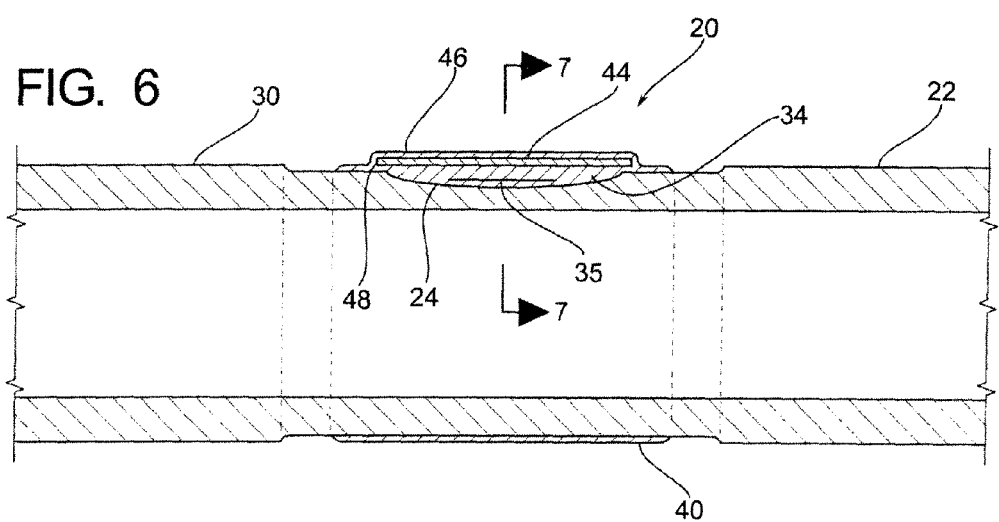
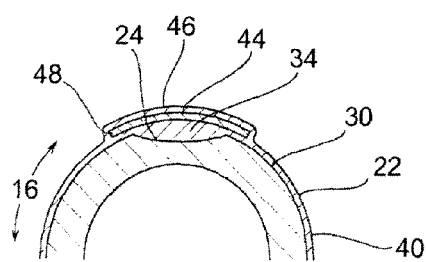

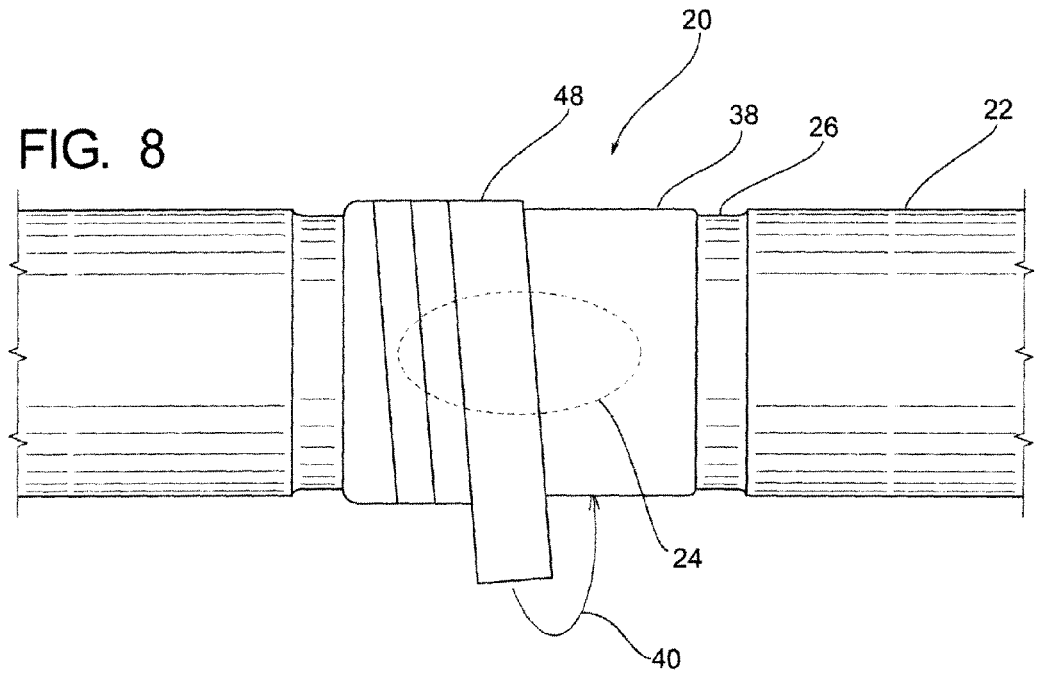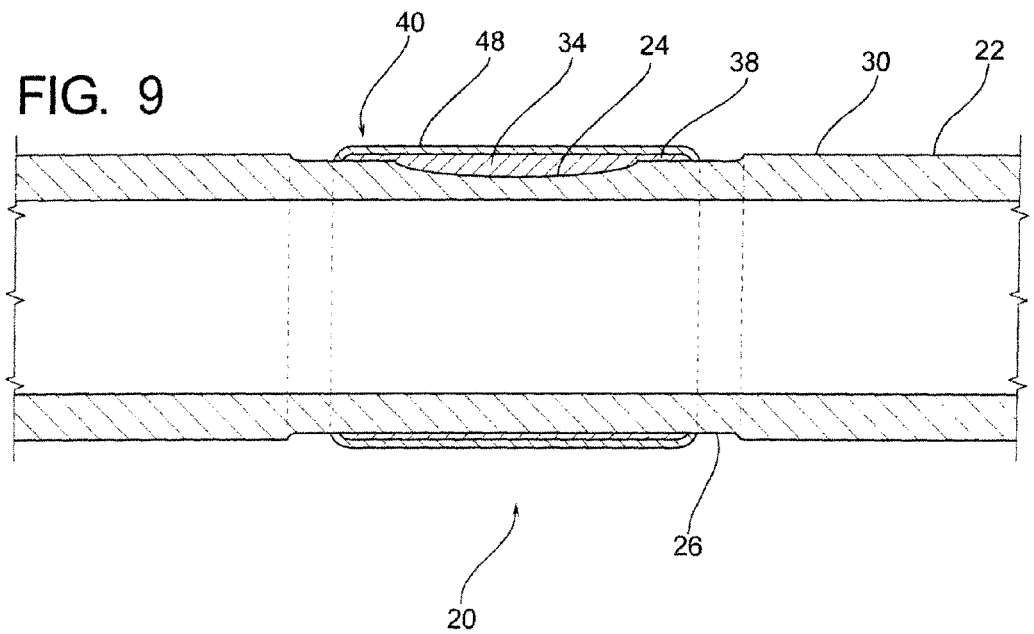

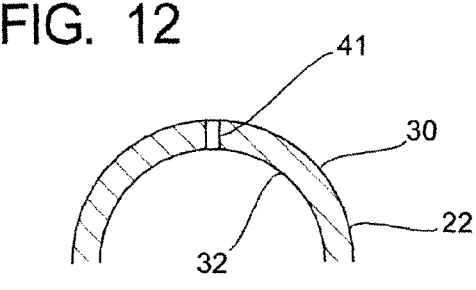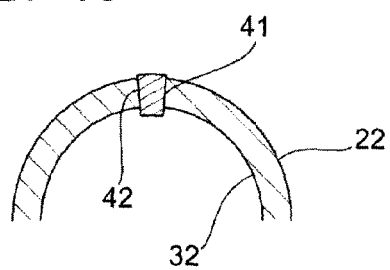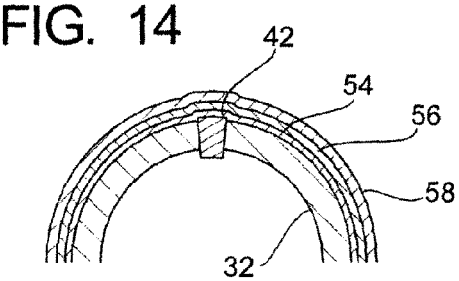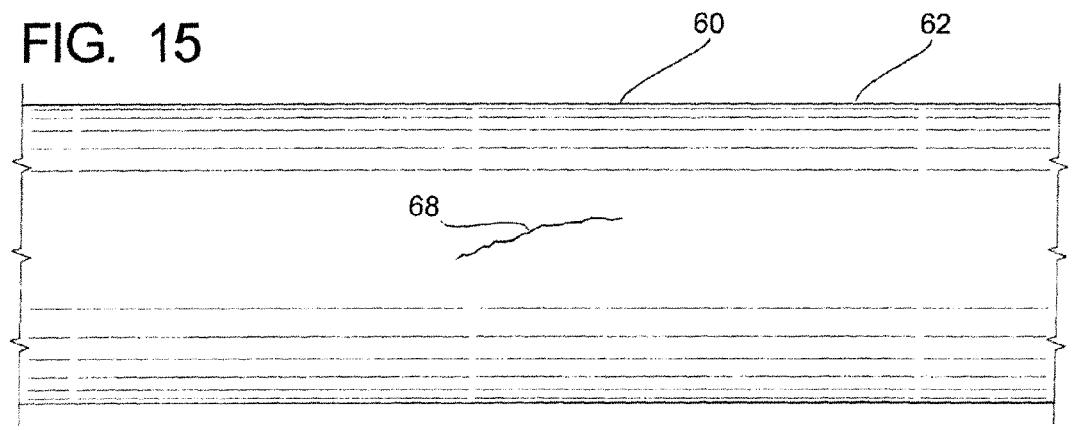

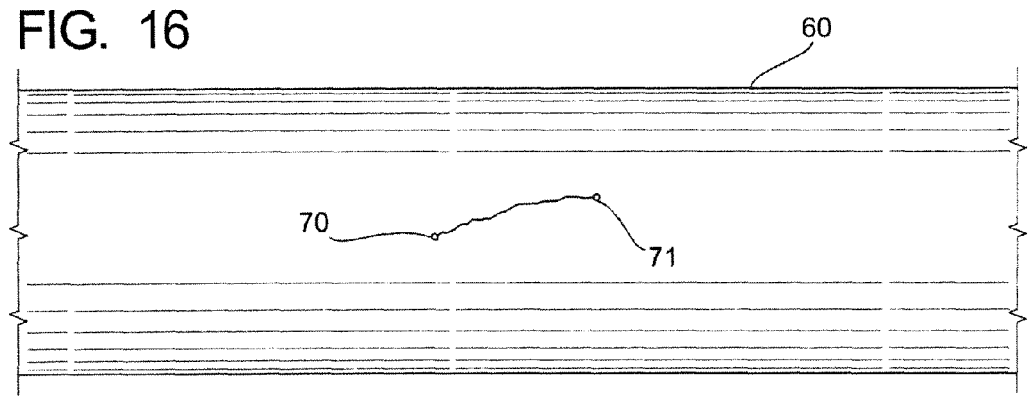
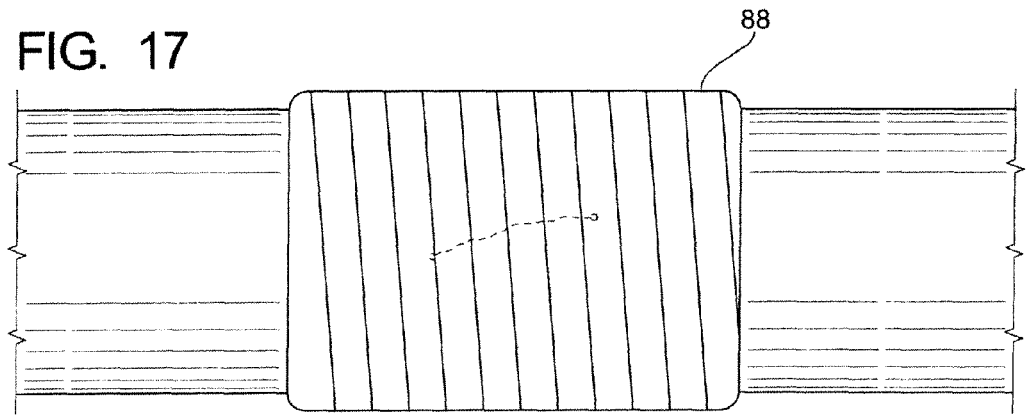

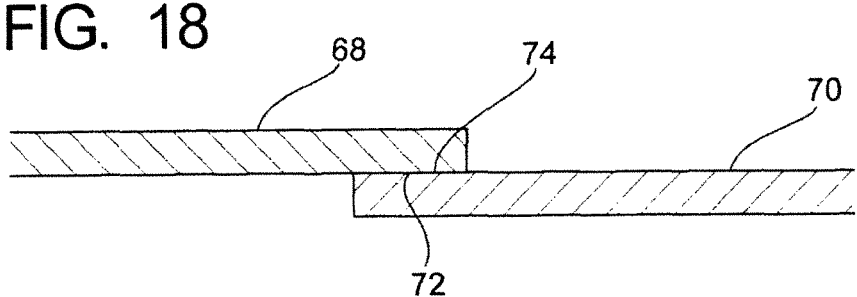
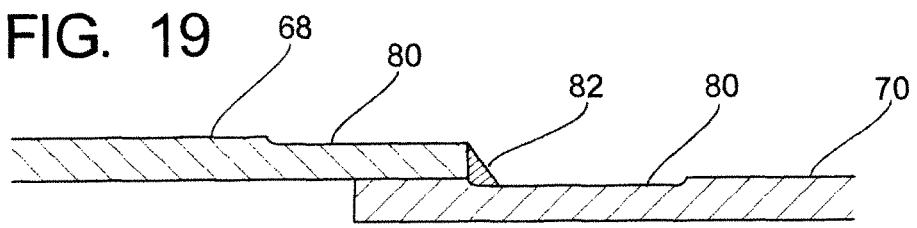
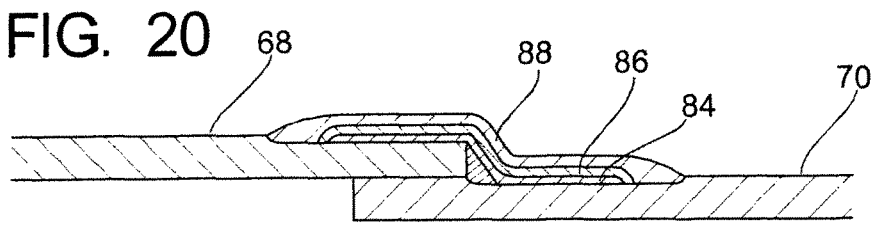

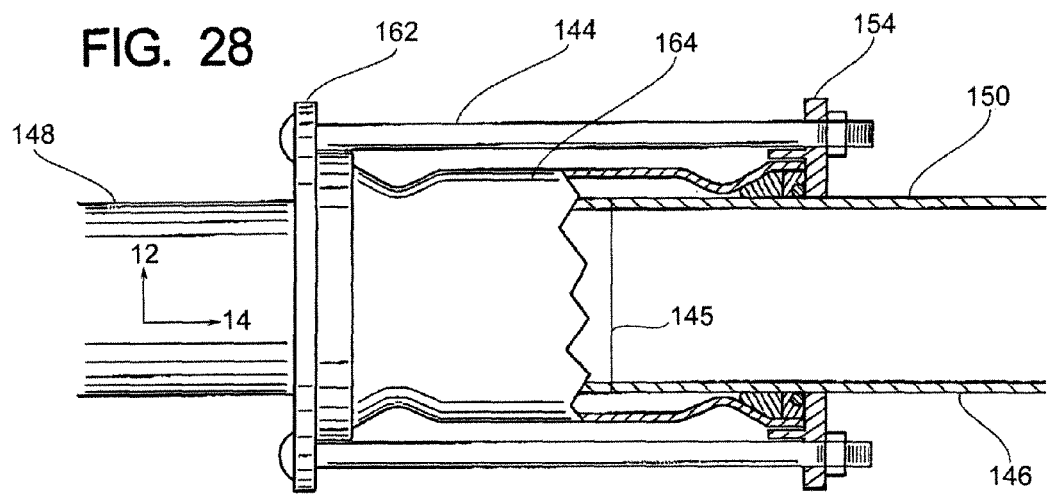
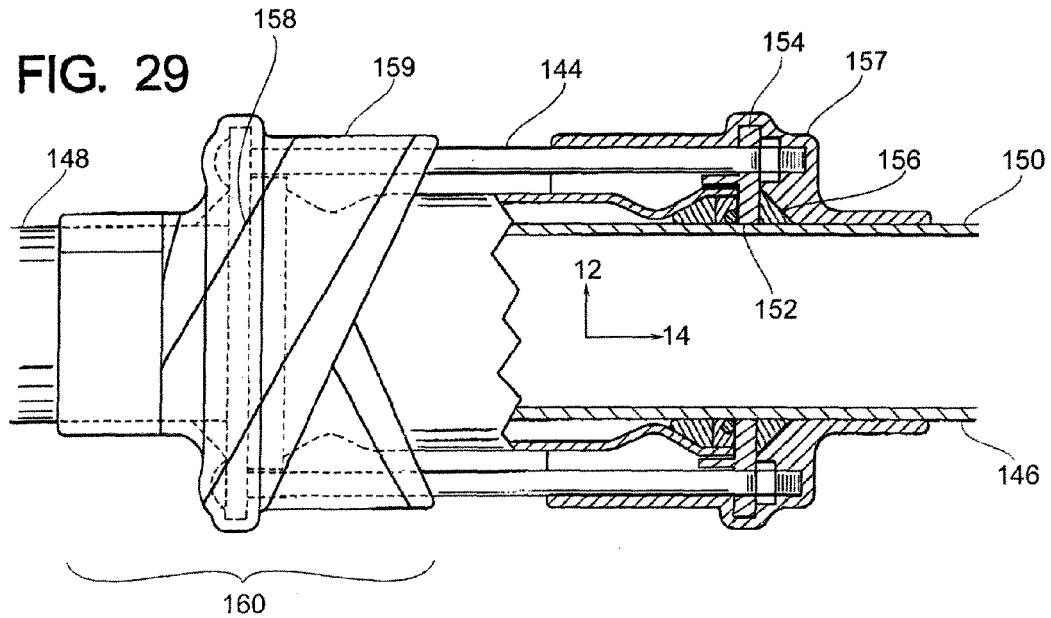

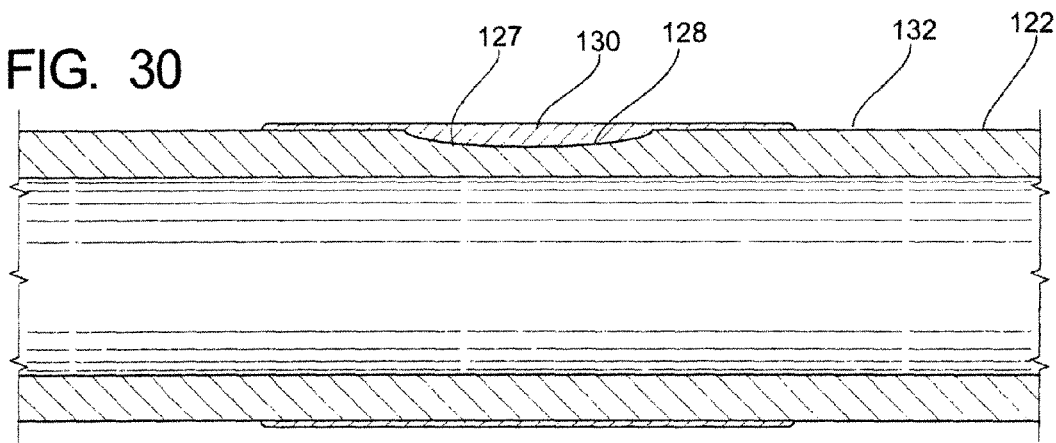
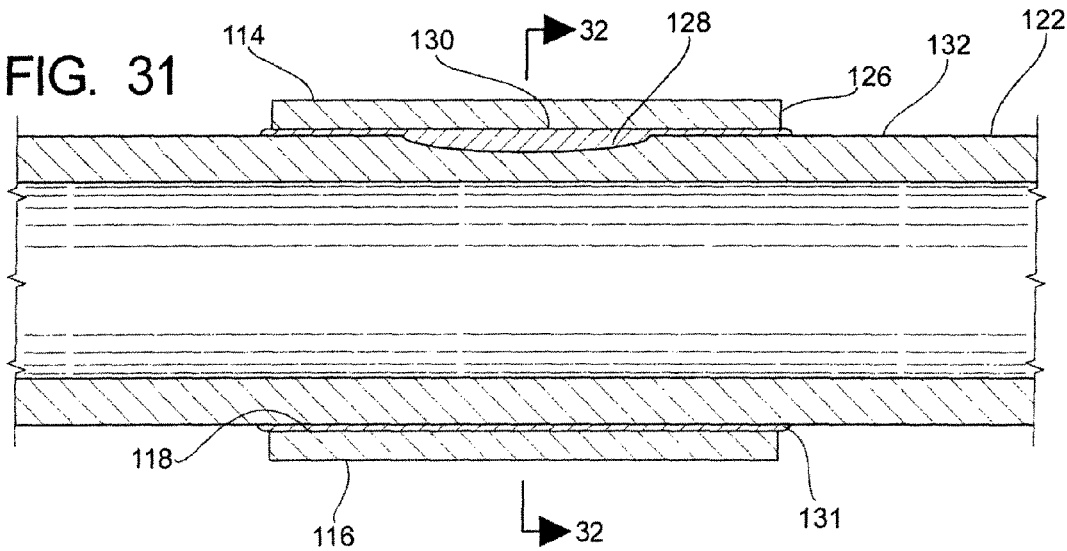

REPAIR SYSTEM AND METHOD

RELATED APPLICATIONS

This application is a Continuation-In-Part of U.S. Ser. No. 12/368,106, filed Feb. 9, 2009, now U.S. Pat. No. 7,938,146 and incorporated herein by reference, which in turn claims priority benefit of U.S. Ser. Provisional No. 61/027,200, filed Feb. 8, 2008 and U.S. Ser. Provisional No. 61/103,631, filed Oct. 8, 2008.

BACKGROUND OF THE DISCLOSURE a) Field of the Disclosure

This disclosure relates to the field of methods to repair or strengthen pipe, pipe fittings, and related structures. In one form, the disclosure relates to repairing of thermoplastic pipe and thermoplastic fittings.

b) Background Art

Prior solutions to repairing of pipes, pipe fittings, including thermoplastic pipes and similar structures containing fluid under pressure often require removal of a section of the damaged pipe, or a bypass around the damaged section. In repairs to polyethylene pipe in particular, it has been shown that the adhesives commonly used for repairing of structures such as pipes will not sufficiently adhere to the surface of these thermoplastic, PE, MDPE, and HDPE pipes. As these pipes are often used to transport hydrocarbons, and other fluids including fuel, water, and sewage underground, failures in the pipes and fittings cause substantial concern. In metal pipes, the welding of patches forms heat stressed regions which can be prone to failure.

Current repairs and bypasses are extremely expensive, time-consuming, often unsafe, may result in unnecessary environmental damage, and often do not solve the original problem. As there are approximately 80-thousand miles of thermoplastic pipe being installed every year, this problem must be addressed soon or we will eventually have a very drastic environmental and societal problem.

In the art of existing repair methods of repairing steel pipes, several problems exist. One problem is that when a hole or substantially weakened portion of the pipe is created there is no effective, quick, cheap, safe, environmentally friendly and substantially permanent way of repairing these damaged portions.

In the art of floating covers and similar structures in storage tanks and equivalent structures, flexing and movement of the floating cover often causes stress fractures and larger cracks in the surface of the cover. Current methods to repair these floating lids have proven insufficient.

In the art of thermoplastic pipes, it is often desired to put a fitting on the pipe. For example, to provide a constant supply of the material transported by the pipe to a remote location, such as a residential home. Such a fitting is disclosed in U.S. Pat. No. 4,894,521 incorporated herein by reference. These saddle-type fittings and similar structures have proven to fail over time as the inner surface of the fitting becomes disconnected from the outer surface of the pipe forming a gap through which fluids can escape. Recently, a T-fitting failed, leaking explosive gases into a nearby residential home, which then exploded. The explosion killed at least one occupant. Regarding the compression style fittings, currently, in the state of Texas alone, there are 200,000 estimated failures of these compression style fittings in gas supply lines. These compromised fittings cause substantial problems to the supply of gases and other fluids, as well as environmental and safety concerns. Understandably, a means for repairing these fittings quickly, cheaply and easily is very much desired.

In the art of compression fittings, flexing and movement of the pipe results in a disassociation of the inner surface of the compression fitting from the outer surface of the pipe. This movement can cause leakage, which there is no repair to at this time. One example of such a fitting is the steel compression fitting, as disclosed in U.S. Pat. No. 4,603,893 although many variations of these fittings are utilized. These types of fittings are used to couple two ends of thermoplastic or other pipe.

SUMMARY OF THE DISCLOSURE

Disclosed herein is a method for repairing a pipe or pipe fitting having a compromised section. The repair system includes several steps. One step includes exposing the compromised section of the pipe and then cleaning the surface of the pipe upon and adjacent to the compromised section. It may be then desired to abrade at least a portion of the surface of the compromised section and the immediate area of the pipe there around. Once this is accomplished, the repair personnel may dispose at least one layer of adhesive upon the abraded surface, wherein the adhesive is comprised of a compound, which cures to a semi-rigid state. After applying the adhesive, at least one layer of fibrous material may be disposed upon the layer of adhesive, wherein the layer of fibrous material comprises fibers, and wherein a portion of the adhesive is disposed between adjacent fibers of the material when cured.

It may then be desired to dispose at least one layer of a second adhesive upon the fibrous material, wherein the second adhesive is comprised of a compound which cures to a substantially rigid state. Once this step is accomplished, it may be desired to dispose at least one layer of a second fibrous material upon the layer of second adhesive. The layer of second fibrous material may comprise fibers substantially in alignment with the circumference of the pipe, and wherein a portion of the second adhesive is disposed between adjacent fibers of the second fibrous material when cured.

Prior to applying the adhesive, in one form it may be desired to heat the surface of the compromised section and the area of the pipe immediately adjacent to the compromised section prior to disposing the layer of material.

The repair methods disclosed work well wherein the compromised pipe comprises thermoplastic and other pipe. Such thermoplastic pipes include polyethylene, medium density polyethylene or high density polyethylene pipe among others.

When the compromised section of pipe comprises an indented portion, such as an area compromised by oxidation or impact damage, it may be desired to fill the indented portion of pipe substantially to the level of the pipe adjacent the indented section prior to disposing the layer of fibrous material upon the surface of the pipe. To strengthen this filled area, it may be desired to dispose a portion of fibrous material upon the filled area of the indented portion of pipe substantially to the level of the pipe adjacent to the indented section.

To enhance adhesion, it may be desired to pierce, and/or score and/or abrade the surface of the compromised section and the immediate area of the pipe therearound. This may be accomplished by way of a needle-like tool, cutting tool, sandpaper, or equivalents, which do not form holes through the wall of the structure, but roughens or forms dimple-like depressions in the surface.

While patches covering only a small portion of the circumference of the structure may be desired, in one form, the layer of adhesive is disposed substantially around the entire circumference of the pipe and the layer of fibrous material is disposed substantially around the entire circumference of the pipe.

One way of applying the adhesive is to dispose at least one layer of adhesive upon the surface of the compromised section and disposing the layer of adhesive upon the layer of material prior to disposing the combined adhesive and material to the pipe.

A major advantage of this repair in one form is that the repair may be conducted while a pressure variance exists between the fluid within the pipe and the atmospheric pressure outside the pipe. Thus it is not required to lose pressure and thus increase down time of the system.

Many adhesives and bonding agents may be used. In one form the adhesive is comprised of at least two parts, a resin and a hardener, wherein at least one of the resin and hardener are disposed upon the material prior to disposing the material on the pipe. It may be desired to dispose a UV light-resistant coating to the repaired portion of the pipe.

Where the compromised portion extends substantially through the wall of the structure, it may be desired to insert a plug through a wall of the pipe to substantially fill a void in the pipe prior to disposing the first layer of adhesive.

The disclosed methods in several forms are very useful for repairing a cover in a fluid tank, the cover having a compromised section and the repair system comprising several steps. A first step may be to expose the compromised section of the cover so that it can be easily and directly repaired. It may then be desired to clean the surface of the cover upon and adjacent to the compromised section and also abrade the surface of the compromised section and the immediate area of the cover there around. This provides a surface more conductive to adhesion, disposing at least one layer of adhesive upon the surface of the compromised section and the area of the cover immediately therearound. To maintain a good adhesive bond, the adhesive is comprised of a compound which cures to a semi-rigid state. Once the adhesive is in place, it may be desired to dispose at least one layer of material upon the layer of adhesive, wherein a portion of the adhesive is disposed between adjacent fibers of the material when cured. This repair method has been tested effective wherein the cover is operatively configured to float on the surface of a fluid. This repair method has also been tested and is effective wherein the compromised section comprises at least one fracture, and the method further comprises the step of drilling at least one hole in at least one end of the fracture. This functions to stop propagation of the fracture.

Prior to applying the adhesive to the structure, it may be desired to dispose an absorbent layer in contact with the compromised section; and then dispose a non-absorbent layer of non-porous material over the absorbent layer.

In one form, the material used comprises a substantially rigid metal steel plate. Alternatively, the material is comprises a fibrous material, such as fiberglass cloth, fiberglass matt, or equivalent materials.

Once again, it may be desired to insert a malleable plug to fill any holes within the compromised section.

Tests have been conducted where the ends of two pipe sections are held approximately 1" apart and approximately ¾" misaligned. These pipe sections were then fluidly connected using a method similar to those described above. One step of a method of connecting these two sections of pipe, wherein the sections are not in physical contact, involves scoring and/or abrading one or both sections of pipe. A user may then dispose a volume of adhesive upon one or both sections of pipe, wherein the adhesive cures to a substantially semi-rigid state. A layer of fibrous or unitary material may then be placed upon the adhesive, and over the gap between the two pipe sections forming a fluid connection between the two sections. In one form, the material bridges the gap diagonally as a series of overlapping layers. This series of overlapping layers may be thicker over the gap than at the ends of the wrapped portion. In one form, the material will comprise a volume of adhesive between the fibers prior to installation. This provides a flexible patch across the gap upon installation. In one form, the semi-rigid layers extend approximately 2" to 10" on either side of gap between the two pipe sections. A layer or layers of a fibrous or unitary material with a volume of adhesive, which cures to a substantially rigid state, may be placed over this semi rigid state as described above.

It may also be desired to dispose a UV light-resistant coating to the repaired portion when the repaired portion may be exposed to light.

Another use is disclosed for repairing a pipe fitting comprising a vulnerable portion, the method for repairing the pipe fitting comprising several steps. A first step may be to expose at least a portion of the compromised pipe fitting such that it can be readily and easily repaired. It may then be desired to clean the surface of the pipe fitting to be repaired and the area adjacent the vulnerable portion. Another step involves disposing at least one layer of adhesive upon the surface of the vulnerable portion and the area of the pipe immediately therearound, wherein the adhesive is comprised of a compound which cures to a semi-rigid state. Another useful step involves disposing at least one layer of material upon the layer of adhesive, wherein at least one of the layers of material comprises fibers substantially in alignment with the circumference of the pipe; and wherein a portion of the adhesive is disposed between adjacent fibers of the material when cured.

This method may also involve the step of heating the surface of the compromised portion and the area of the pipe fitting immediately therearound.

In one form, the fitting is a compression coupling, butt fusion coupling, or electro-fusion coupling.

In one form the adhesive used comprises a two-part adhesive.

The method for repairing a pipe fitting disclosed above may also include the step of abrading or piercing the surface of the compromised section and the immediate area of the pipe fitting therearound to provide a surface more receptive to adhesion.

The method for repairing a pipe fitting disclosed may also include the step of inserting a substance between the pipe and the fitting prior to applying the adhesive. The substance used may comprise oakum, rubber strips, rubber bands, or equivalent structures.

A method for repairing a pipe having a vulnerable section is also disclosed. This method also comprises several steps. A first step may be to expose at least a portion of the compromised pipe so that it can be easily repaired or strengthened. Once the pipe or structure is exposed, it may be desired to clean the surface of the pipe to be repaired upon and adjacent to the compromised section. It may be desired to dispose at least one layer of adhesive upon the surface of the pipe overlapping the compromised section of pipe, wherein the adhesive is comprised of a compound, which cures to a semi-rigid state. A user may then dispose a first rigid sleeve portion onto the adhesive. It may then be desired to dispose at least one layer of fibrous material upon at least one edge of the sleeve and pipe adjacent the sleeve, wherein the layer of fibrous material comprises fibers; and wherein a portion of the adhesive is disposed between adjacent fibers of the material when the adhesive is cured.

The method disclosed may further comprise the step of disposing overlapping layers of fibrous material/adhesive to further secure the rigid sleeve portion to the pipe.

The method disclosed may further comprise the step of adhering a second rigid sleeve portion onto the adhesive adjacent the first rigid sleeve portion. Additional sleeve portions may also be added such that the longitudinal edges of adjacent sleeve portions are offset. The sleeve portions may be disposed upon the pipe such that the longitudinal edges of the sleeve portions are arranged in vertical opposition. It may also be desired to abrade the surface of the compromised section and the immediate area of the pipe fitting therearound. In one form, the pipe and the first and second sleeve portions are comprised substantially of metal, rigid polymers, or equivalent structures. It may also be desired to dispose a layer of adhesive to the interior side of the sleeve prior to attaching the sleeve to the pipe. One alternative comprises the step of disposing a second layer of fibrous material and a second layer of adhesive over the first layer of fibrous material and first layer of adhesive wherein the second adhesive cures to a substantially rigid state.

BRIEF DESCRIPTION OF THE DRAWINGS

Each of the figures is highly schematic to make the repair method easier to understand.

FIG. 1 is a plan view of a section of pipe having a compromised portion.

FIG. 2 is a cutaway side view of a section of pipe having a compromised portion.

FIGS. 4-6 are cutaway side views of a section of pipe in the process of being repaired using the disclosed method in one form.

FIG. 7 is an end cutaway view of a section of pipe in the process of being repaired using the disclosed method in one form.

FIG. 8 is a plan view of a section of pipe in the process of being repaired using the disclosed method in one form.

FIGS. 9-11 are cutaway side views of a section of pipe in the process of being repaired using the disclosed method in one form.

FIGS. 12-14 are end cutaway views of a section of pipe in the process of being repaired using the disclosed method in one form.

FIG. 15 is a plan view of a structure having a compromised portion in the form of a crack.

FIGS. 16 and 17 are plan views of a compromised structure in the process of being repaired using the disclosed method in one form.

FIGS. 18 through 20 are side cutaway views of a structure in the process of being repaired using the disclosed method in one form.

FIG. 28 is a partial cutaway view of a compression coupling.

FIG. 29 is a partial cutaway view of a compression coupling in the process of being repaired.

FIGS. 30 and 31 are side cutaway views of a compromised pipe section in the process of being repaired using a clamshell sleeve in one form.

DESCRIPTION OF THE PREFERRED EMBODIMENTS

Figure 3:
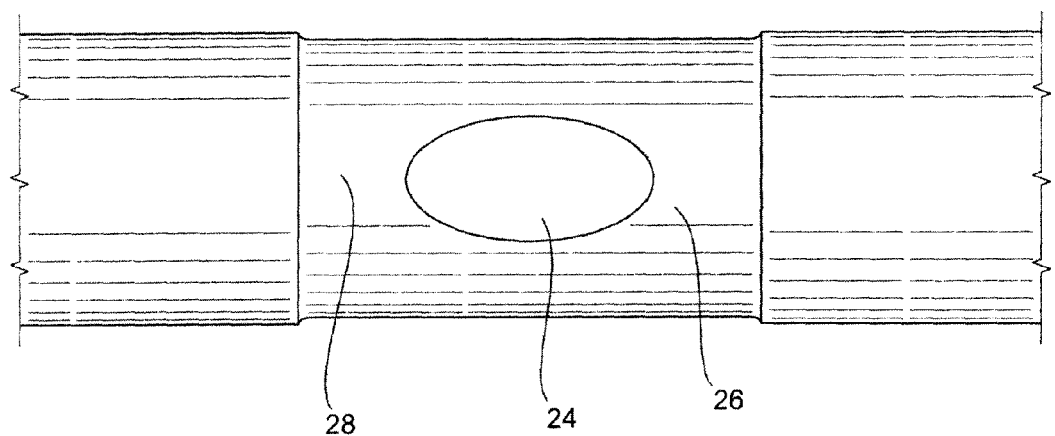
FIG. 3 is a plan view of a section of pipe in the process of being repaired using the disclosed method in one form.

There have been several attempts to repair such damaged pipes, covers, fittings and structures; however, they have all proven insufficient for one reason or another. Several repair apparatus and methods are disclosed below to help in understanding the status of the field of art. However, these methods are not meant to be a complete disclosure of prior art solutions. They are representative examples of repairs only.

Prior art approaches to repairs of polyethylene and other types of pipe and structures often involve removing and replacing the damaged portion of pipe with a new section of pipe. Such repairs are disclosed in U.S. Pat. No. 5,254,824 which discloses a process of coupling the repair sleeve to the damaged portion using microwave technology. This process not only involves significant work in installing the repair sleeve, it is also problematic in the use of microwave technology for fusing to a structure in the field. This patented method is no stronger than the original connection prior to the effected repair. U.S. Pat. No. 5,613,807 requires that a hole be drilled in the damaged portion of the pipe, a patch section installed over the hole, and a vent installed over the patch. This process has significant disadvantages, including that the vent sometimes cannot be shut off.

The Chevron Phillips Chemical Co. LP in an article (book) "Bulletin: PP900 Book 1—Chapter 4" ©September 2003 discloses a process wherein surface damage may occur during construction handling and installation of polyethylene pipe. The article states that "damage or butt fusion misalignment in excess of 10% may require removal and replacement of the damaged pipes section or reinforcement with a full repair clamp." It is further stated in the article that damaged pipe cannot be "repaired" by filling the damaged area with an extrusion nor by hot gas welding. The specification describes how a replacement is accomplished by using a flanged spool or by using an electro-fusion technique or by using a fully restrained mechanical coupling.

Applicant discovered that a relatively inexpensive, easy, and permanent repair does not appear to exist in the art and is desired. Applicant's inspiration was a repair that consisted of interoperating materials that could flex and give, to allow for movement and expansion, but would not flow, and thus, would retain the integrity of the vessel to be repaired and would effectively encapsulate the damaged or failed area and seal the vessel (pipe or structure).

Before going into a more detailed description, axes 10 are provided in FIG. 2 showing a radially outward axis 12, and a longitudinal axis 14. Also shown in FIG. 7 is a circumferential path 16. These directions and orientations are for ease in understanding only and should not be construed as limiting. The term "compromised" used herein meaning failed, weakened, leaking, damaged, impaired, or ruptured for the sake of continuity. While the term "pipe" is used consistently throughout this disclosure to define a substantially cylindrical structure for carrying fluids, the repair method may also be used on similar structures such as fluid holding tanks, barrels, fluid transport vehicles and equivalent structures. The term semi-rigid is used to denote structures and materials which can be flexed and bent repeatedly without breaking or cracking, but will not flow. Note that the figures are highly schematic and not drawn to scale.

In this disclosure, the term semi-rigid describes a state which when using a three point rigidity test can be flexed requires a relatively small force to bend the substance wherein the substance will not break even when flexed multiple times. The term substantially rigid describes a state which when using a three point rigidity test requires much more force to bend the substance than the semi-rigid material, and the substance may break or crack or fail when flexed multiple times.

Normal operating pressures for these pipes and fittings range from relatively low pressures for some forms such as PE pipe, to relatively high pressures for other forms such as steel. One range for PE pipe includes pressures from 20 to 100 PSI. Of course other ranges are possible depending upon the materials and construction techniques used. Steel pipe may carry fluids under pressure into the thousands PSI.

Pipe Repair

Figure 4:
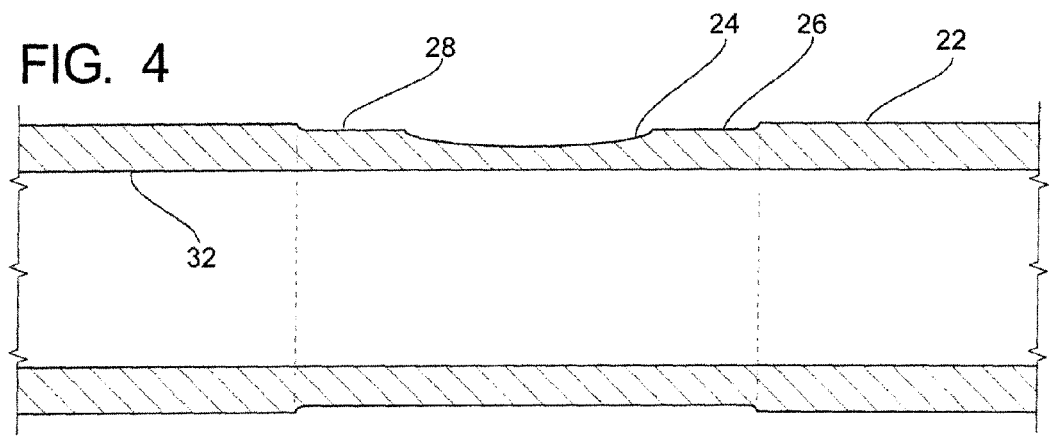
Figure 11:
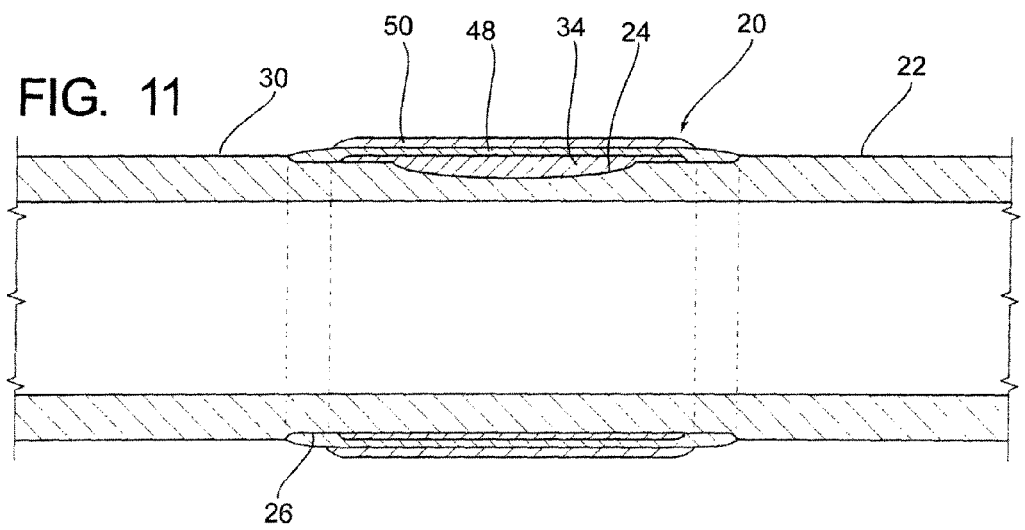

To accomplish a repair 20 to a compromised or vulnerable section of pipe 22, as shown in FIG. 11, wherein the pipe is comprised of materials such as polyethylene, metal, Kevlar, carbon fiber and the like, utilizing one form of the embodiment of the disclosure, the compromised portion 24 must first be identified and accessed. It may be desired to substantially reduce or eliminate fluid pressure within the pipe prior to affecting the repair, although this is not always necessary. Tests have shown that many of these repairs can be utilized while there is some fluid pressure within the pipe or structure. Some examples have been successfully accomplished with internal fluid pressures of up to 30 psi or more. The compromised portion 24, of the pipe as shown in FIGS. 1 and 2, and the area surrounding the compromised portion are cleaned of debris and other contaminants. Many cleaners are available for this purpose including acetone, toluene, and the like. As the surface of many pipes are substantially smooth (which does facilitate a firm adhesive bond), an abraded, scored and/or pierced surface may be desired. For example, the person(s) conducting the repair could utilize a coarse grit sandpaper (in one range 20-220 grit) to "rough up" the surface of the compromised portion 24, and the adjacent portion 28, as shown in FIGS. 3 and 4. This abraded surface 26 could extend on either side of the damaged portion 24 to cover an adjacent portion 28. In one example, the abraded surface 26 could extend ½" or more on all sides of the compromised portion 24. The abraded surface 26 could in one form extend from the edge of the compromised portion 24 up to the distance equal to the diameter of the pipe 22 or more. The abraded surface 26 may extend circumferentially 16 around the diameter of the outer surface 30 of the pipe 22 as shown in FIG. 4. Once again, contaminants left over from the abrasion process should be removed prior to continuing.

Looking to FIG. 4, once the compromised portion 24 and overlap portion 28 are sufficiently abraded, the pipe adjacent to the compromised portion 24 may be heated such as by a propane or acetylene torch or heat gun. The pipe could be heated up to 100°, 180° or more as long as the melting point of the pipe 22 is not reached.

A roll perforator, which is a tool designed to dispose a number of small perforations in a surface can also be utilized to pierce the surface. These devices are known in the art of laying of fiberglass material, such as for boat building and often comprise a wheeled portion with a number of needle-like projections such that the tool can be "rolled" around the abraded surface 26 and provide a number of perforations (piercings) which do not extend through the interior wall 32 of the pipe 22. These perforations further provide an improved adhesion surface for the repair method.

Once the portion of the pipe to be repaired has been heated and perforated following the process in one form, a volume of adhesive filler 34 is disposed upon the compromised portion 24 as shown in FIG. 5. If the compromised portion is indented below the plane of the adjacent pipe, the adhesive can be used to substantially raise the compromised portion 24 to the level of the outer surface 30 of the pipe 22. Raising the level of the compromised portion disperses any radially outward pressure resulting from the flow of pressurized fluid through the pipe 22 and also seals the surface from further corrosion. A volume of material 35 may be disposed upon this first layer of adhesive filler 34, as shown in FIG. 6, to further strengthen the compromised portion 24. For larger compromised portions 24, it may be desired to alternate layers of adhesive filler 34 and material 35 to build up a patch upon the compromised portion 24 to raise it to the level of the outer surface 30 of the pipe 22, or beyond. In one form, the material 35 may comprise bilateral woven mat, knit fabric, roving, or other materials made from fiberglass, carbon fiber or similar compounds. In one form, the material retains flexibility and elasticity due to the structure of the fibers, or the weave of the material, prior to adding a bonding agent and curing. The material 35 could also be a unitary structure, such as a metallic plate or sheet polymer. Many of these materials 35 are known in the art of boat-building and other composite construction fields. The adhesives used effectively cure to a semi-rigid state such that that temperature fluctuations and physical movement in the apparatus will not cause the repair to become brittle and disassociate from the surface of the compromised pipe. Testing has shown that common epoxies and adhesives which are designed to adhere to some pipes and surfaces, especially polyethylene and high-density polyethylene, cured to a hard and rigid state. These adhesives failed in time, and needed to be repaired again. As stated before the structure bends and flexes due to movement and/or temperature fluctuations, these rigid adhesives cannot flex and thus crack/break over time. Other adhesives may cure to a nearly fluid state and thus do not form a permanent bond to the failed structure as movement tends to disassociate the outer material layers and/or the surface of the structure from the adhesive.

In one form of effecting a repair as shown in FIGS. 6 and 7, a rigid plate 44 may be disposed over top and in contact with the adhesive filler 34 to cover the compromised portion 24. This rigid plate can be utilized wherein a significant portion of the pipe 22 has been compromised, or when internal pressures would necessitate such an improved repair. Once the rigid plate 44 is in place, an outer layer 46 may be disposed upon the rigid plate 44 and around the outer edge 48 of the rigid plate 44.

Once the damaged portion 24 is properly prepped for the next step of the repair, in one form of the repair 20 a layer of adhesive 38 is disposed circumferentially around the pipe 22, as shown in FIGS. 8 and 9. A circumferential layer of material 48 is then "worked in" to the adhesive 38 as shown in FIG. 8. It may be desired to extend this layer of adhesive 38 and material 48 beyond the compromised portion 24. It may also be desired to "build up" several layers on the circumferential portion 40 by alternating multiple layers of adhesive 38 and material 48. This can be accomplished by multiple strips of the material 48 or may be a single long strip of material 48, as shown in FIG. 8; for example, three to twenty layers of material 48 alternating with layers of adhesive 38. The adhesive will tend to "work in" between the strands of the material forming a cohesive interoperating structure which is semi rigid and allows for flexing and thermal expansion/contraction.

It may also be desired to have one or more of the layers being formed of a first type of material 48 and adhesive 38 as shown in FIG. 9, and further outer layers being comprised of a different material and/or a different adhesive. Different fibrous materials and adhesives may be utilized as the adhesive in contact with the outer surface 30 of the pipe 22 designed to provide a flexible and adhesive bond to the pipe 22, and the outer layers designed to form a more rigid and structural wrap to increase hoop strength of the overall repair. While the term adhesive is used to describe this second adhesive, a cast-like substance could also be utilized. Such a cast-like substance may not adhere to any surface of the structure, or may adhere to structures made of some substances, but would in either case hold adjacent fibers in relative position when cured to a substantially rigid state.

Figure 10:
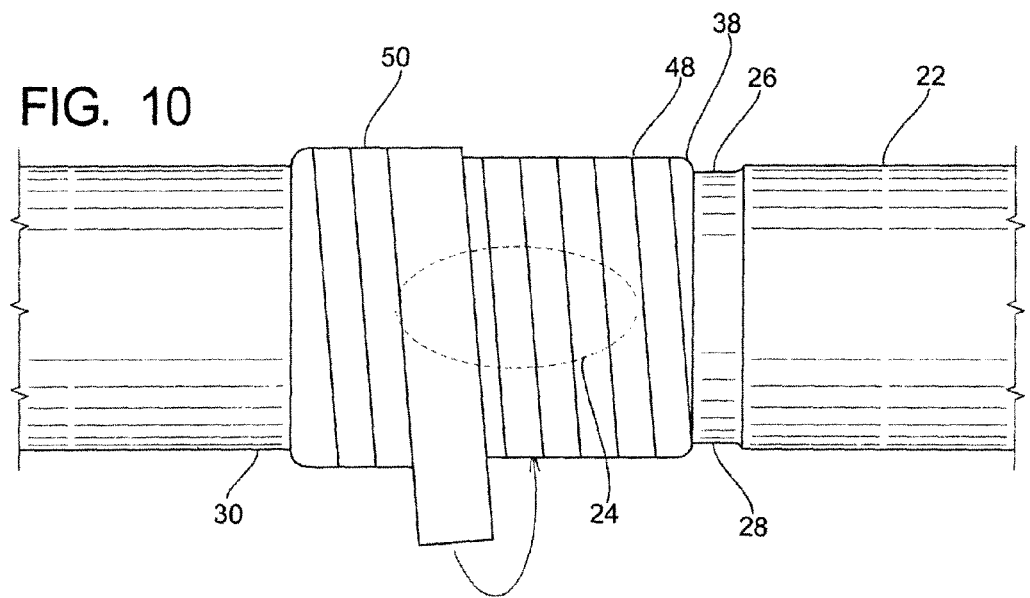

In one embodiment, an outer layer 50 shown in FIGS. 10 and 11 consisting of an adhesive and a material can be disposed upon the outer surface of the repair thus far. For example, a layer 50 of polyester or fiberglass type material intermixed with a hardening adhesive such as Pipe Wrap may be utilized. In one form, the compound is immersed in water for at least 30 seconds prior to application then tightly wrapped around the repaired portion. This outer layer 50 is massaged and tensioned to form a tight and secure bond which holds the repair in place. In one form the outer layer 50 hardens to a substantially rigid state and thus holds the semi rigid components against the pipe for a substantially permanent bond and repair. While many different materials can be utilized, the term substantially rigid will be used to describe the broad group of materials used.

In another embodiment, still referring to FIG. 10, once the compromised portion 24 is substantially raised to the level of the outer surface 30 of the pipe 22, multiple layers of material 48 impregnated with a securing compound may be added. This may be accomplished by impregnating the material 48 with a resin/hardener mixture prior to applying the material 48 to the abraded surface 26. This may also be accomplished by adding an adhesive to the material, and then applying this combination to the abraded surface 26 and the compromised portion 24. An activator may then be applied which "kicks off" a chemical reaction in the adhesive. In one form, a material 48 is utilized which comprises an adhesive already applied, such as by the manufacturer. Thus, the material 48 can be applied in a "dry" form and subsequently activated. The activation can be accomplished through application of heat, water, chemicals or other methods.

For some applications it may be desired to heat the pipe 22 prior to perforation. It may also be desired to cool the pipe prior to perforation or after perforation. Cooling the pipe 22 prior to completing the repair reduces the diameter of the pipe and results in reduced surface cracking due to thermal cycling after the repair is completed.

Wherein some adhesives and some materials do not react well to sunlight, it may be desired to add a sunlight-resistant coating, such as a layer of translucent or opaque material to the outer layer where the repaired portion may be exposed to sunlight.

The entire process beginning to end can be accomplished in 30 minutes or less depending on several factors, including pipe diameter and access to the compromised portion. This is substantially less than most prior art solutions and involves substantially less cost not only in repair materials, but also in labor and downtime. The exposed portion of a buried pipe can be backfilled in as little as one hour or less depending on the adhesive utilized, ambient temperature, and humidity.

In one form, the adhesive filler 34 and/or adhesive 38 of FIG. 9 may be formed of a two-part composite comprising a resin and hardener. As polyethylene pipe breathes, or expands and contracts radially as its temperature increases and decreases, the adhesives utilized should retain some elasticity once hardened or cured and remain semi-rigid. This will also help to eliminate stress-corrosion cracking. Tests so far have shown that the repair utilizing Lord brand adhesives below maintains up to 30% elasticity even after the adhesive has cured. Several of the adhesives successfully utilized comprise two-part metal bonding adhesives. The repair 20 in one form substantially adheres to the compromised portion 24 and adjacent portion 28 of the pipe 22. The outer layer 50 substantially hinders the pipe from expanding and contracting and increases hoop strength of the pipe 22 at the repair 20. An adhesive bond between the outer substantially rigid layer 50 and the adhesive subs flex layer further supports the structure and increases the hoop strength of the pipe 22.

Regarding the semi-rigid adhesive, tests have been conducted using adhesives manufactured by the Lord Corporation. Such adhesives tested include Lord Fuser® 108B/109B Metal Bonding Adhesive. Also tested was Lord Fuser® 110B/111B Metal Bonding Adhesive. This adhesive was designed to have a faster cure time then the 108B/109B adhesive. Also tested was Lord Fusor® 112B/113B Metal Bonding Adhesive. This adhesive was also designed for bonding body panels to vehicles with a slower cure time then the above listed adhesives. Also tested was Lord Fusor® 147/148 Plastic Bonding Adhesive. This adhesive was designed for bonding small body panels, ground effects and headlight brackets to vehicles. The particular components and method for making this particular adhesive is proprietary information, and not available to the public at this time. This adhesive was designed to adhere body panels to vehicles, and thus not previously used in the field of piping or piping repairs as far as applicant knows. These adhesives have been found to adhere sufficiently to the pipes and fittings tested and retained their adhesion and elasticity over time. Other adhesives and adhesive fillers could be utilized with the same results, provided that the adhesives and/or adhesive fillers cure to a semi rigid state as previously defined. As the manufacturers of many of these pipes have indicated that sufficient adhesion is not possible with known methods, and prior attempts to effect such a repair to some pipes, especially high density polyethylene, have proven insufficient, it is believed that this method is novel.

In some cases, the damaged portion 41 may extend through the interior wall 32 of the pipe 22, as shown in FIG. 12. In these cases, it may be desired to first substantially reduce or eliminate any fluid pressure in the pipe 22. The fluid passing through the pipe 22 may contain hydrocarbons or other fluids which sometimes hinder or prohibit curing or adhesion of the adhesive filler. These fluids may also hinder the adhesive from bonding to the outer surface 30 of the pipe 22. Once the pressure is relieved, a plug 42, as shown in FIG. 13, could be inserted through the compromised portion 41. This Plug 42 may extend into the interior wall 32 of the pipe 22. Insertion of the plug could be facilitated by a clamp, such as a pipe clamp, C-clamp or the like. The plug 42 may additionally be adhered in place. At this point, the compromised portion 41, overlap area, plug 42, and the circumferential region of the pipe 22 should again be cleaned of contaminants. One of the processes listed above could then be followed to enable a repair of the damaged pipe 22. The resulting patch could include the plug 42, an adhesive layer 54, a material layer 56 and a substantially rigid layer 58. It may be desired to provide a plug made out of a soft, malleable material, such as synthetic rubber, acrylic adhesive or the like, which would not only be easy to install and conform to the compromised portion, but would have additional advantages. The plug may slightly disrupt the fluid flow through the pipe 22, but not substantially. In many uses of fluid pipes, inspections are carried out. During these inspections, a sensor device called a "pig" is often inserted into the pipe 22 to run the length and check for damage, weakened areas, and blockages. Using a plug material with very low shear strength would ensure that as the pig passes the plug, the pig would "shear off" the portion of the plug extending through the interior wall 32.

Storage Tank Repair

Figure 21:
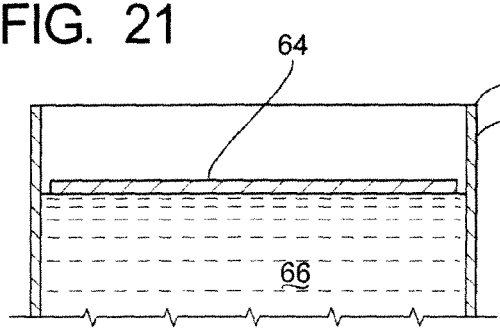
FIG. 21 is a side cutaway view of a storage tank having a floating cover portion.

In another form, the process can be utilized to repair a structure 60 of a holding or storage tank outer shell 62, as shown in FIG. 15. As shown in FIG. 21, many of these holding or storage tanks have a cover 64, which may float on the surface of the fluid 66 being stored within the outer shell 62. For example, these tanks may be constructed to store oil, fuels, hydrocarbons, and other fluids. The floating cover 64 hinders substantial evaporation of the oil 66 within the tank.

Figure 22:
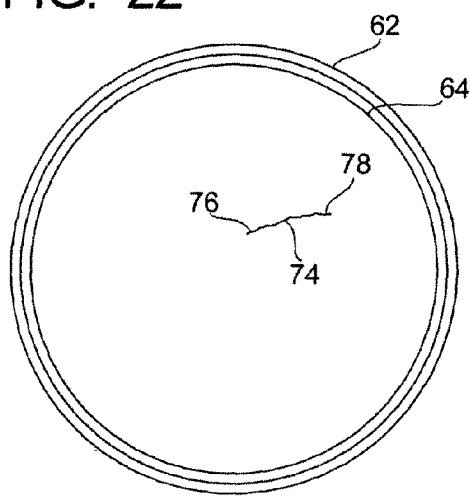
FIGS. 22-24 are plan views of a structure in the process of being repaired using the disclosed method in one form.

These floating covers 64 have been known to be compromised, such as by stress fracture cracking often caused by movement of the floating cover 64 as the fluid 66 moves. Such a fracture 74 is shown in FIG. 22 where the cover is depicted as a unitary structure, although a cover made of adjacent plates as shown in FIGS. 18-20 can also be repaired using a similar method. Prior art repairs to such compromised covers generally fall into two categories. The first category involves draining the fluid from the tank at which point the floating cover can be accessed and the compromised portion can be repaired by welding the compromised portion, or by welding a patch over the damaged portion. The second category involves simply disposing a volume of epoxy over the top of the compromised portion. This second category does not solve the problem, and often the cover will continue to move and eventually the damage will propagate through the epoxy. When the epoxy has become compromised, yet another layer of epoxy is often disposed upon the old layer of epoxy until this new layer is also compromised.

Often these covers are comprised of individual plates 68 and 70, as shown in FIGS. 18-20. The plates 68 and 70 are welded together or otherwise secured at an overlap portion 72. As these covers may be floating on the surface of a fluid, they are prone to stress failure. These failures potentially cause leakage through the cover 64, which increases undesired evaporation, and possibly compromise the floating ability of the entire cover structure. The covers may also comprise the body of the tank, such as the perimeter side wall, or the roof.

Thus, it is has been found effective to repair this compromised portion using an adhesive filler, material, and adhesive in a manner very similar to that previously discussed.

Figure 23:
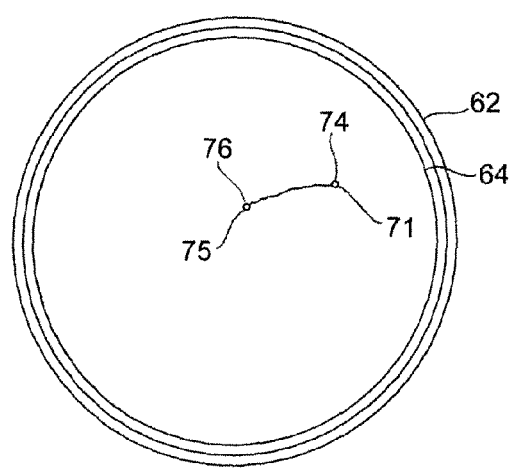
Figure 24:
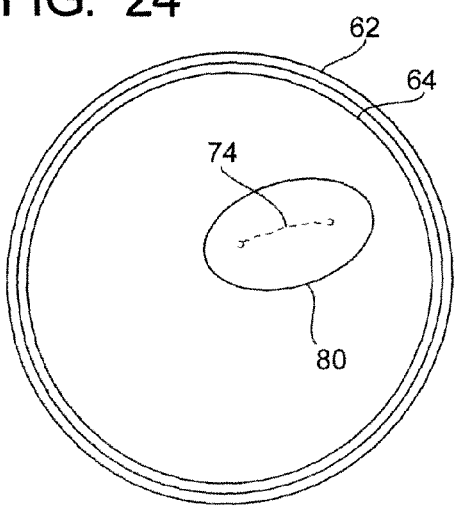

The example shown in FIG. 22 shows a stress fracture 74 which extends from a first end 76 to a second end 78. As can be seen in FIGS. 18-20, the cover 64 may comprise a plurality of plates, such as plates 68 and 70. The stress fracture 74 may cross the welded portion between the adjacent plates 68 and 70 or may follow the seam between the two adjacent plates. To facilitate the repair of this stress fracture 74, in one form, as shown in FIG. 23, a hole 75 is drilled, ground, or otherwise provided at the first end 76 of the stress fracture 74 and a second hole 71 is drilled at the second end 78 of the stress fracture 74. These holes 70 and 71 function to stop the propagation of the stress fracture 74; as the holes allow the fracture to expand and contract without stressing the ends of the fracture. This same method of drilling a hole to relieve stress fracture propagation was used to stop the crack in the Liberty Bell. After this point, a region 80 is abraded on the surface of the cover 64, and the repair method previously discussed is utilized. Malleable plugs may be used to fill the holes drilled to hinder leakage during the repair. The stop leak patch method described below may be utilized at this point. In one form, as shown in FIG. 19, a volume of adhesive filler 82 is utilized to form a fillet between the first plate 68 and the second plate 70. This adhesive fillet 82 allows subsequent layers to be formed and cover the compromised area without sharp curves, as would be present without said fillet. Using a process similar to that previously discussed, an adhesive layer 84 is disposed upon the plate 68, plate 70 and adhesive fillet 82. A layer of material, as previously discussed, is then worked into this adhesive layer 84. To cover the entire repair, a substantially rigid layer 88 or equivalent is then disposed upon the material 86 as previously defined. One substantial advantage of the adhesive used in one form is that it is capable of adhering to metal surfaces, polyurethane, polyethylene, high-density polyethylene, and polyester pipes, and also to the fabric material used. As previously stated, this allows for a repair patch, which is allowed to flex and bend as the cover 64 flexes and bends, thus forming a permanent repair. Once again, we have successfully utilized metal bonding adhesive in such a repair.

Stop Leak Patch

Figure 34:
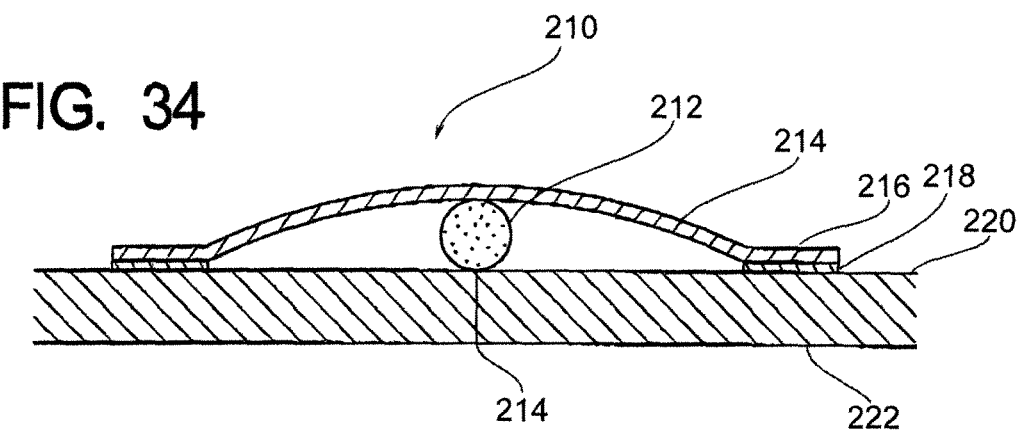
FIG. 34 is a side cutaway view of a stop leak patch repair using the disclosed method in one form.

In some instances, the leak or failure in the pipe, cover, or fitting may be such that the fluid exuding through the failed area interferes with the ability of the user to repair the damaged or compromised section. Thus it may be desired to form a barrier layer made of a non-porous material prior to enacting the repair. It may be possible to upgrade the surface around the failed portion, but other aspects would not be possible in some instances. Thus a stop leak patch has been devised. Shown in FIG. 34, one embodiment of this stop leak patch 210 incorporates a volume of an absorbent substance 212 disposed substantially directly over the seam, hole, failure, or otherwise compromised portion 214. Over the top of the adhesive substance 212, a non-porous cover 214 is attached at a perimeter portion 216 by way of an adhesive 218 to the outer surface 220 of the damaged structure 222. In one form, the adhesive substance 212 comprises a fibrous, or oleophilic material, which is coupled by way of adhesive or other methods to the non-porous cover 214 prior to attaching the patch 210 to the structure 222. Additionally, the adhesive 218 may also be attached to the non-porous cover 214 prior to attaching the patch 210 to the outer surface 220. Thus it would be possible to abrade the outer surface 220 of the failed structure 222, quickly clean off any debris and residue, and then quickly attach the patch 210. It may not be necessary to wait for the adhesive 218 to cure prior to completing the repair embodiments. In one form, the non-porous cover 214 may be a rigid structure, such as a non-porous layer of a fibrous material such as fiberglass impregnated with a hardening or bonding agent.

Repair of a Vulnerable Fitting

Disclosed next is another application of the process described above. While the description refers to repairing of a compromised fused thermoplastic fitting, this process has other applications for pipes and fittings of other materials which are vulnerable to failure or where reinforcement is desired to prevent a failure. The process disclosed below substantially consists of the same processes and materials to those previously disclosed. These apparatus and methods can also be used on metallic and non-metallic pipes and fittings. The use of the process on failed a thermoplastic fitting is used as one example, for ease of understanding the disclosure.

Figure 25:
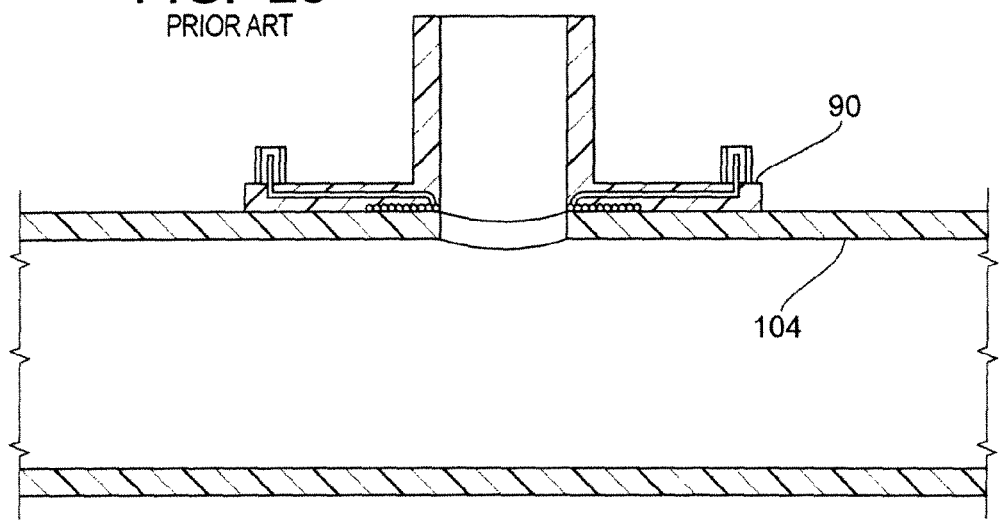
FIG. 25 is a side cutaway view of a prior art thermocouple saddle fitting positioned upon a pipe structure.
Figure 26:
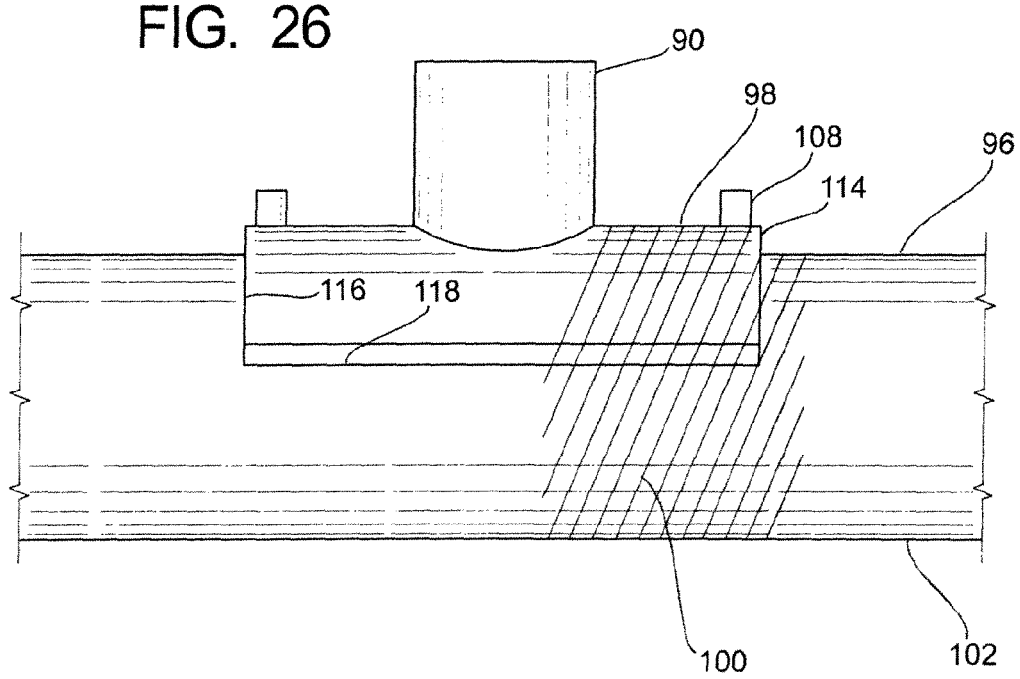
FIG. 26 is a side view of a thermocouple saddle fitting positioned upon a pipe structure.
Figure 27:
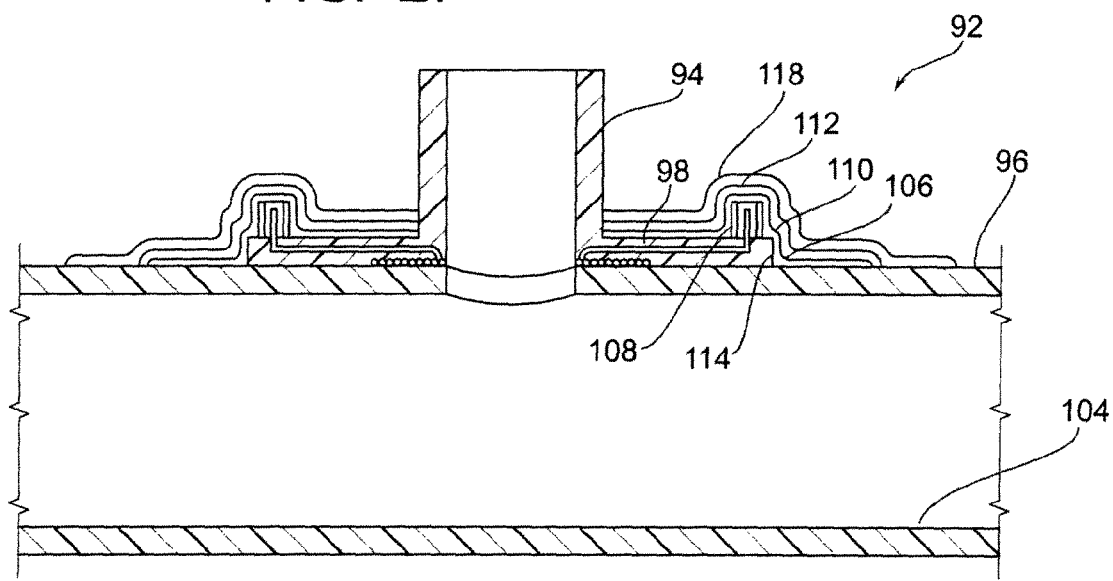
FIG. 27 is a side cutaway view of a section of pipe and a fitting in the process of being repaired using the disclosed method in one form.

As shown in FIGS. 25-27, it is known in the art that electrofused fittings 90, such as the T-fitting shown and described in U.S. Pat. No. 4,894,521 (herein referred to as the '521 patent) and incorporated herein by reference, have been known to fail.

To accomplish a repair 92 to a compromised fitting 94, coupled to a thermoplastic distribution pipe 96 in one form, as shown in FIG. 27, the compromised fitting 94 must first be identified and accessed. It may be desired to substantially reduce or eliminate fluid pressure within the distribution pipe 96. The compromised fitting 94 and surrounding areas are again cleaned of debris and other contaminants. As the surface of these fittings and thermoplastic pipe is often substantially smooth (which may not allow for a firm adhesive bond), an abraded surface 100 shown in FIG. 26 may be formed on the repair area to enhance the adhesive bond. For example, the person(s) conducting the repair could utilize a coarse grit sandpaper (in one range 20-220 grit) to "rough up" the surface of the saddle 98, and a portion of the distribution pipe 96. For example, the abraded surface 100 could extend ½" or more on all sides of the fitting 90 around the compromised area. The abraded surface 100 could extend from the edge of the fitting 90 up to the distance equal to the diameter of the distribution pipe 96 or more. The abraded surface 100 may extend around the diameter of the outer surface 102 of the distribution pipe 96. Once again contaminants should be removed following abrasion. Once the surface 102 is sufficiently abraded, the abraded surface 100 may be heated, such as by a propane or acetylene torch or heat gun. The abraded surface 100 may be heated up to 100°, 180° or more, as long as the melting point of the pipe and/or fitting is not reached. A roll perforator, as previously explained, can then be utilized. Looking to FIG. 27, these devices can be "rolled" around the surface substantially defined by the abrasion or cleaning step and provide a number of piercings, which do not extend through the interior wall 104 of the distribution pipe 96 or the saddle 98. These piercings further provide a good adhesive surface upon the distribution pipe 96 for the adhesive and other materials.

Still referring to FIG. 27, once the portion of the pipe to be repaired has been heated, and perforated, following the process in one form, a volume of adhesive filler 106 may be disposed upon the distribution pipe 96 to substantially form a fillet, with the surface of the saddle 98. Additional filler may be used around the terminals 108 to form another set of fillets. These fillets serve as a more rounded structure and a bonding agent for the subsequent material layers.

Once the hard edges are effectively filleted, in one form of the repair 92, an additional layer of adhesive 110 may be disposed circumferentially around the distribution pipe 96 and saddle 98. A circumferential layer of material 112 is then worked into the adhesive 110. It may be desired to extend this layer of adhesive 110 and material 112 beyond the perimeter 114 of the fitting 94, including the circumferential edge 116 and the longitudinal edge 118 (See FIG. 26). It may also be desired to "build up" a substantial repair patch by alternating multiple layers of adhesive 110 and material 112 as previously disclosed and shown in FIG. 27. This build up of layers can be accomplished by using multiple strips of the material 112, or by using a single relatively long strip of material 112. For example, three to twenty layers of material 112, alternating with layers of adhesive 110 may be used. In one form, the material 112 can be bilateral woven mats, roving, knit or other fibrous or some unitary materials. In one form, it is desired to utilize a material, which is formed such that while the fibers may not be elastic in and of themselves, the material is elastic as a structure due to the method with which the fibers are interlaced or woven. Materials such as fiberglass, carbon fiber and similar materials as previously disclosed may be utilized. Many of these materials are known in the art of boat-building and other composite construction fields.

In another embodiment, multiple layers of material, which may be different from the material 112, impregnated with a securing compound may be added over the repair just disclosed. This may be accomplished by impregnating a material with a resin/hardener mixture prior to applying the substantially rigid material 118. This may also be accomplished by adding a securing compound to the material, and then applying this combination to repair. An activator may then be applied which "kicks off" a chemical reaction in the securing compound. In one form, a material 118 is utilized which comprises a securing compound already applied, such as described previously. Thus, the material 118 can be applied in a "dry" form, and subsequently activated. The activation can be accomplished through application of heat, water, chemicals, or other methods.

For some applications, it may be desired to heat the abraded surface 100, including a portion of the fitting 94 and a portion of the distribution pipe 96, prior to perforation. It may also be desired to cool these portions prior to perforation or after perforation. Cooling the distribution pipe 96 prior to completing the repair can function to reduce the diameter of the pipe and results in reduced surface cracking due to thermal cycling.

Wherein some adhesives 110 and some materials 112 do not react well to sunlight, it may be desired to add a sunlight-resistant covering, such as a layer of translucent or opaque material to the outer layer where the repaired portion may be exposed to sunlight.

The entire repair process beginning to end may be accomplished in 30 minutes or less depending on several factors, including pipe diameter and access to the compromised portion. This is substantially less than most prior art solutions and involves substantially less cost, not only in repair materials, but also in labor and downtime. The exposed portion of pipe can be backfilled if needed in as little as one hour or less depending on the adhesive utilized, ambient temperature, and humidity. Looking at the sheer volume of repairs to be conducted, having a repair process that can be quickly affected is very desirable to those companies and individuals affected by compromised fittings.

The same process can be used to repair electro-fused and non-electro-fused reduction fittings, butt joint fittings, and the like.

Repairing Vulnerable Pipe

A similar repair process can be utilized to install a sleeve patch comprised of composite, metal, carbon fiber, Kevlar, or other material. An example of such a repair is shown in FIGS. 30-33. These fittings are often referred to as clamshell sleeves when two mating sleeves are used. Prior art solutions to repairing compromised sections of steel pipe carrying hydrocarbons and other pressurized fluid often relied upon a pair of such matched half-cylinder sleeve sections 114 and 116. These sleeve sections having an inner diameter 118 substantially the same as the outer diameter 120 of the compromised pipe 122. The half-cylinder sleeve sections described having a longitudinal edge 124 such that they can be placed around the compromised portion of pipe 122. Prior art repair methods welded the longitudinal edges 124 of the sleeve sections. In addition, using prior art repair methods, the circumferential edges 126, were sometimes welded to the damaged steel pipe. These welds would usually form a fluid-tight seal; however, the welded portions would form a weak spot in the pipe at the welds. Welding the sleeve to the pipe often forms a significant heat-stressed area, reducing hoop strength of the pipe which is then prone to failure. One version of utilizing this process to repair a section of compromised pipe is disclosed in U.S. Pat. No. 4,747,430. Once again, a method and materials for improving safety, downtime, and environmental concerns is disclosed.

A substantial improvement to this process is disclosed, wherein the welds are unnecessary. In one form, only the longitudinal welds may be utilized. This improved process would avoid the problems of heat stressing the compromised pipe or fitting. To seal the circumferential edges 126 and/or the longitudinal edges 124, a version of the above-disclosed process can be utilized.

Figure 32:
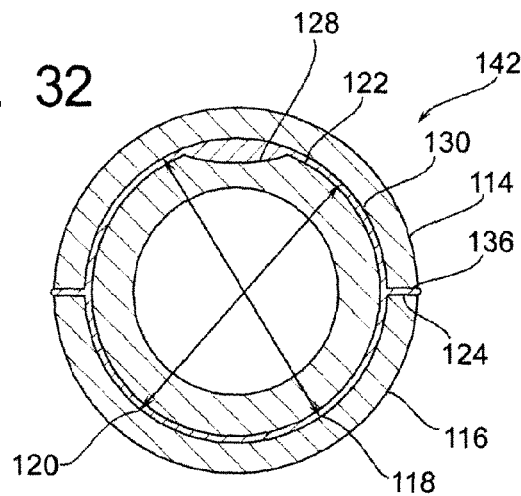
FIG. 32 is an end cutaway view of a compromised pipe section in the process of being repaired using a clamshell sleeve in one form.
Figure 33:
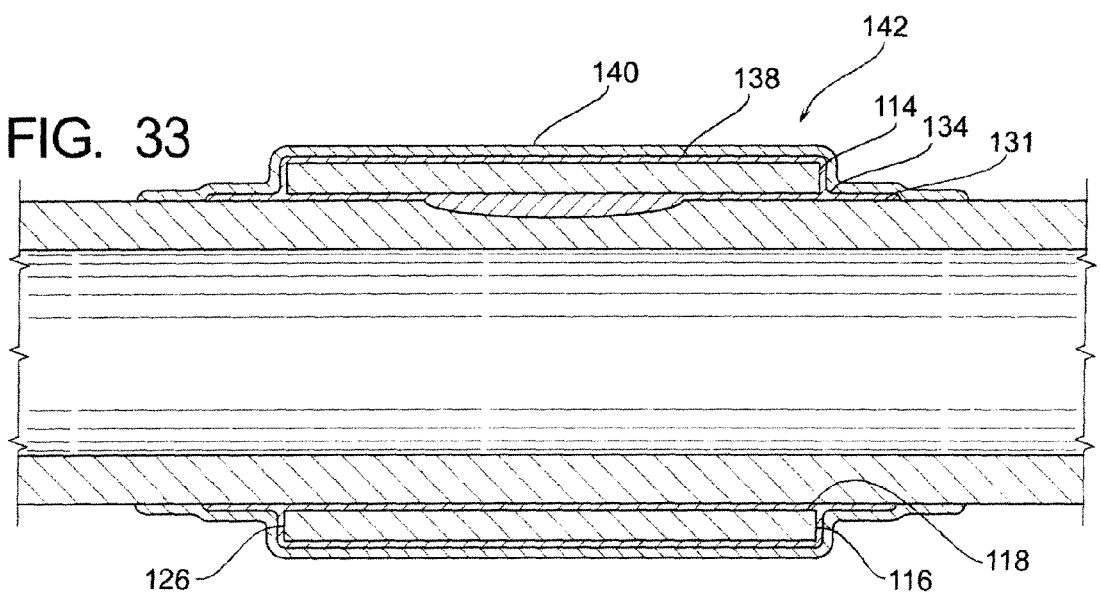
FIG. 33 is a side cutaway view of a compromised pipe section with a substantially completed repair using the disclosed method in one form.

Using the repair process in one form, shown in FIGS. 30-33, the first step of repairing compromised areas as shown in FIG. 30, is to sandblast, grind or otherwise abrade or clean a portion 127 of the outer surface of the compromised pipe 122. Then similarly prepare the inside of the sleeve sections 114 and 116 seen in FIG. 31. This abrasion forms a surface much more receptive to adhesives. In one form, the sleeve sections are long enough to extend longitudinally 6" or more beyond the damaged area 128. In one form, there will be at least 3" past the damaged area 128 on each end. The next step is to fill the damaged area with a filler material 130, as shown in FIG. 30, and let the filler material 130 cure. It may be necessary to grind or sand down any protruding filler 130 flush with the outer surface 132 of the pipe so the sleeve sections fit tight against the outer surface of the damaged pipe. An adhesive material 131, shown in FIG. 31, such as the adhesives previously discussed or other equivalent adhesives which cure to a semi-rigid state, is then disposed upon the inner surface 118 of the sleeve section 116. It may be desirable to install the lower sleeve section before the upper sleeve section. In some applications, such as for example in a span, it may be desirable to have the sleeve sections horizontally opposed, rather than vertically opposed. It may be desirable to put a substantial amount of adhesive filler 131 on the sleeve 116, for example ¼-inch thick, this thick layer of adhesive substantially fills most voids and scratches. Much of this adhesive may be squeezed out around the edges, and may need to be removed prior to continuing. In one form, a layer of adhesive 10 to 30 mil thick remains to adhere the two surfaces together. A mechanical device, such as a hydraulic jack, chain or strap, may be necessary at this point to pull the sleeve 116 tight against the damaged pipe 122. The adhesive material should squeeze out all the way around the sleeve section. It may be desirable to tighten the tensioning device till the adhesive squeezes out all the way around the circumferential edge, ensuring a continuous bond. Once the adhesive has cured, repeat the process with the other sleeve section 114. Alternatively the second sleeve can be installed before the adhesive on the first sleeve has cured. Additional adhesive or filler may be added as shown in FIG. 33 to form about a 45° fillet 134 between the pipe and the sleeve section. If there is a longitudinal gap 136 along the longitudinal edge 124 as shown in FIG. 32, between the two sleeve sections, it may be desirable to completely fill that gap also with the adhesive material. A layer 138 of material/adhesive is then disposed around the pipe 122 and over at least a portion such as the circumferential edges 126 of the first and second sleeve. The next step in one form is to wrap the sleeves with a band of material 140 impregnated with adhesive shown in FIG. 32 such that the adhesive cures to a substantially rigid state. While many widths of material can be used, material having a width of 6" to 10" has been found to be quite effective. Alternatively, the process described above is conceived where alternating layers of material and adhesive are disposed upon the surface. In one form, the material/adhesive layers extend longitudinally no more than 1"-10" from the circumferential ends 126 of the sleeve sections. In one form, in some applications, the material/adhesive layers do not extend beyond the adhesive layer 131. It may be desirable to have these layers as tight against each other as possible. The layering of adhesive and material may be repeated till there are eight wraps or more. While the embodiment and FIG. 33 shows the entire first and second sleeve covered by the repair consisting of the layer 138 and the substantially rigid layer 140, this is not always necessary. It may be sufficient to adhere the first and second sleeves to the exterior surface of the pipe followed by wrapping the layers 138 and 140 to encapsulate the circumferential and/or longitudinal edges.

The two interoperating sleeve sections in one form comprise a rigid cover to the compromised portion as shown in FIG. 32. This repair method also provides corrosion protection both to the outer surface 132 of the damaged pipe 122, and also to the inside 118 of the sleeve sections 114 and 116. This method of providing a repair 142 also significantly increases the hoop strength of the pipe 122 at the repair 142 compared to several prior art repair methods. This repair method can be effected more quickly, easier and at less expense than prior methods. In addition, should the damaged pipe 122 continue to corrode, the corrosion would not extend into the repair sleeves as the filler and adhesive materials form a thermal and galvanizing insulator between the damaged pipe and the sleeves. This inherent and chronic problem of continued corrosion of the pipe and the repair sleeve(s) has been a significant concern with prior repair methods, especially where the sleeve is welded and thus not electrically and chemically isolated from the compromised portion of pipe. Often the repair using this new method can be affected even while the compromised pipe is pressurized, a solution which is not possible with prior art welding methods, as it would not be entirely safe to be welding in the vicinity of leaking volatile and/or flammable fluids, especially fluids under pressure. Tests have shown that a repair can be affected on pipe still in use and under substantially normal operating pressure. This allows for a much less expensive repair and downtime due to reduced flow is significantly less than prior repair methods.

While the embodiment described and shown above shows a linear cylindrical repair, the process could also be used where there is a bend or curve in the compromised pipe. It would only be necessary to match a short section of the compromised pipe 122 with a short, circumferential sleeve 114 with an interior surface 118 mating with the exterior surface 120 of the compromised pipe 122.

Figure 35:
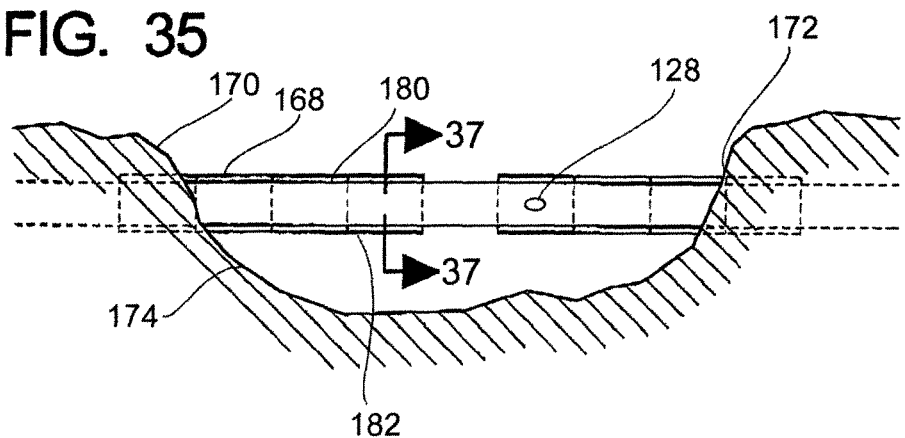
FIG. 35 is a side environmental (hidden line) view of a repair using the disclosed method in one form.

In one form, the repair process disclosed can be used to repair or strengthen a section of pipe 122 above ground. For example, many fluid supply pipes span between banks of riverbeds, creek beds and irrigation canals as shown in FIG. 35. In these applications, the compromised area 128 is easier to access, but light and heat variation are much more of a concern. Additional UV, IR or water repellent layers may be added to the exterior of the repair as previously discussed, to further protect that area of the pipe.

Figure 37:
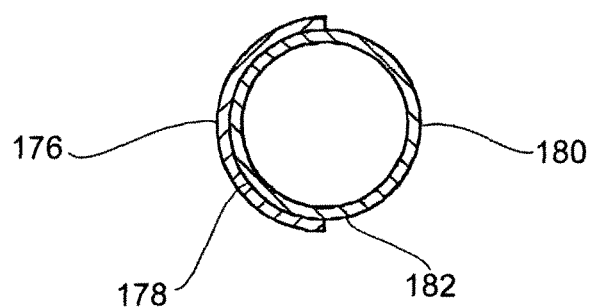
FIG. 37 is an end cutaway view of a repair using the disclosed method in one form.

Looking to the environmental view of FIG. 35, there can be seen a section of pipe 168 which spans the distance between adjoining banks 170 and 172. The banks form a creek bed or other depression 174. Whereas the distance between the banks 170 and 172 can be spanned by a standard length of pipe, no bracing may be required. However, it may be desired to adhere a protective sleeve 176 as shown in FIG. 37 on the upstream side 178 of the pipe 180. This will protect the pipe 180 against damage from debris coming down the creek bed should the water level or debris level rise above the lower edge 182 of the pipe 180. These sleeve sections may also be utilized to strengthen the pipe across a span where such an increase in tensile strength is desired.

Figure 36:
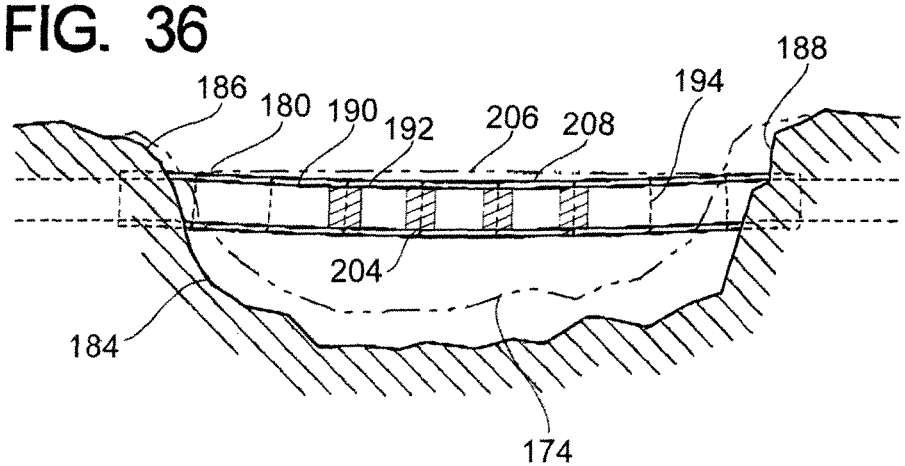
FIG. 36 is a side environmental (hidden line) view of a strengthening system using the disclosed method in one form.
Figure 38:
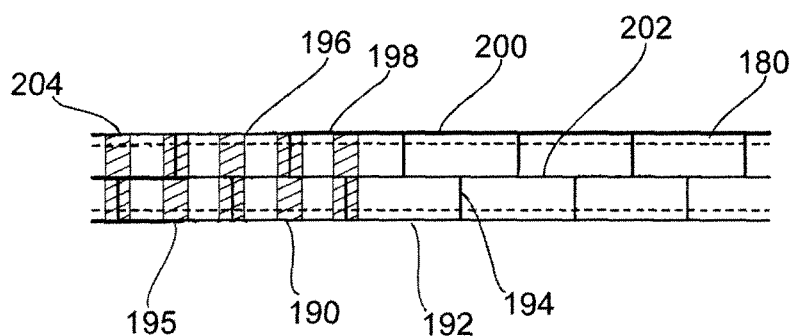
FIG. 38 is a side hidden line view of a repair using the disclosed method in one form.

Looking to the environmental view in FIG. 36, it can be seen how the original creek bed 174 has eroded to a new eroded creek bed 184. Thus the distance between the new creek bed walls 186 and 188 may be such that the pipe 180 is no longer able to support itself. Thus it may be desired to install adjacent sleeves shown as 190 and 192. Of course many more sleeves may be utilized. As shown, the transverse edges 194 of adjacent sleeves 190 may be adjacent and substantially in contact with each other. In one form, the supported portion extends 2-3 sleeve lengths into the ground and at least 2-3 sleeve lengths beyond the point where the pipe erupts from the ground. Often, the most vulnerable point for these spans is where the pipe erupts from the banks 170, 172. Looking to FIG. 38, a plan view of the same installation is shown with the creek beds removed for ease of understanding. As shown, the transverse edges 194 of adjoining sleeves are substantially touching. Horizontally opposite from the sleeves 190 and 192 are a plurality of opposing sleeves 196, 198 and 200. As shown in FIG. 38, the longitudinal edges 202 may form a substantially straight line along the top edge of the pipe 180. Tests have shown that this arrangement, wherein the longitudinal edges 202 vertically oppose each other, provides improved strength to the installation, although other seam orientations are also effective. In one embodiment, as shown in FIG. 38, it may be desired to have the opposing transverse seams offset by up to one-half the width of the sleeve 190. As shown in FIG. 38, this results in a brick-like embodiment such that the vertical edges 194 of horizontally opposing sleeves do not form substantial weak spots in the installation. As discussed before, the sleeves may be installed by disposing a volume of adhesive which cures to a semi-rigid state between the sleeve 190 and the pipe 180. Furthermore, a semi-rigid layer 195 of adhesive and fibrous material may be disposed around the transverse seams 194, optionally followed by a layer of substantially rigid adhesive and fibrous material. In these installations, it may be very advantageous to incorporate a UV light-resisting outer covering over the top of the wrapped portions 204. As can be seen in FIGS. 36 and 38, as the wrapped portions substantially cover the vertical seams 194 in one form, they will also wrap around the central portion of the opposing sleeves 196 and 198.

As shown in FIG. 36, the pipe 180 has sagged from its original position 206 to a lower position 208. Thus it may be desired to raise the pipe 180 to or above its original position 206 before conducting this repair. This may be done by lifting the center section of the pipe from above or below, such as by jacks or other means.

Compression Coupling Repair

In another form, a similar process and materials to those already disclosed can be used to repair a compromised compression coupling as shown in FIGS. 28 and 29. This prior art coupling is disclosed in U.S. Pat. No. 5,851,037, although there are several different versions of these couplings. These couplings 144 are often formed of heavy gauge steel or other metallic components and are thus inflexible. As these fittings 144 are used to butt connect 145 lengths of pipe 146 and 148 which may be flexible pipes. The fitting 144 can become at least partially detached from the outer surface 150 of the pipe 146 forming a gap 152 shown in FIG. 29 along the intersection between the collar 154 of the fitting 144 and the outer surface 150 of the pipe 146. This gap then permits fluid being transported in the interior portion of the pipes 146 to be vented to the surrounding environment.

Thus, a repair method similar to that previously discussed can be utilized as shown in FIG. 29. In one form of conducting this repair, a fillet 156 is formed upon the intersection between the fitting 144 and the pipe 146 and then an adhesive/material patch is wrapped or fitted around this intersection to enclose the gap 152. Through testing it has been found that by forcing a quantity of oakum, rubber strips, or equivalent material into the gap 152 before completing the repair further increases the holding ability of the overall patch. Tests using oakum which was impregnated with an oily substance became compacted when forced into the gap 152 and expanded to fill and seal the gap 152. A layer of adhesive 157 may also be disposed on a portion of the fitting 144 and adjacent pipe 146.

In addition, while previous examples disclosed above relied on substantially circumferential wrapping of the material or material/adhesive combination, it may be desired in this and previous instances to allow for a diagonal wrapping 158 of the material in addition to at least one circumferential wrapping. In other words, a portion of the material could be wrapped along a diagonal path 158, as shown in FIG. 29. These diagonal wraps 158 not only function to seal the gap 152 to maintain fluid therein, but these diagonal wraps 158 can also serve to hold the coupling 144 in place and substantially prohibit it from moving longitudinally 14 along the length of the pipe 146 as the pipe moves, expands and contracts. The final covered area 160 would encompass not only a portion of the pipe 146, but also the collar 162 and a portion of the body 164 of the coupling 144. One of the benefits of this placement of the material is the improvement of strength in a longitudinal 14 and in a deflective/radial 12 direction of the pipe 146 and/or fitting 144.

Figure 39:
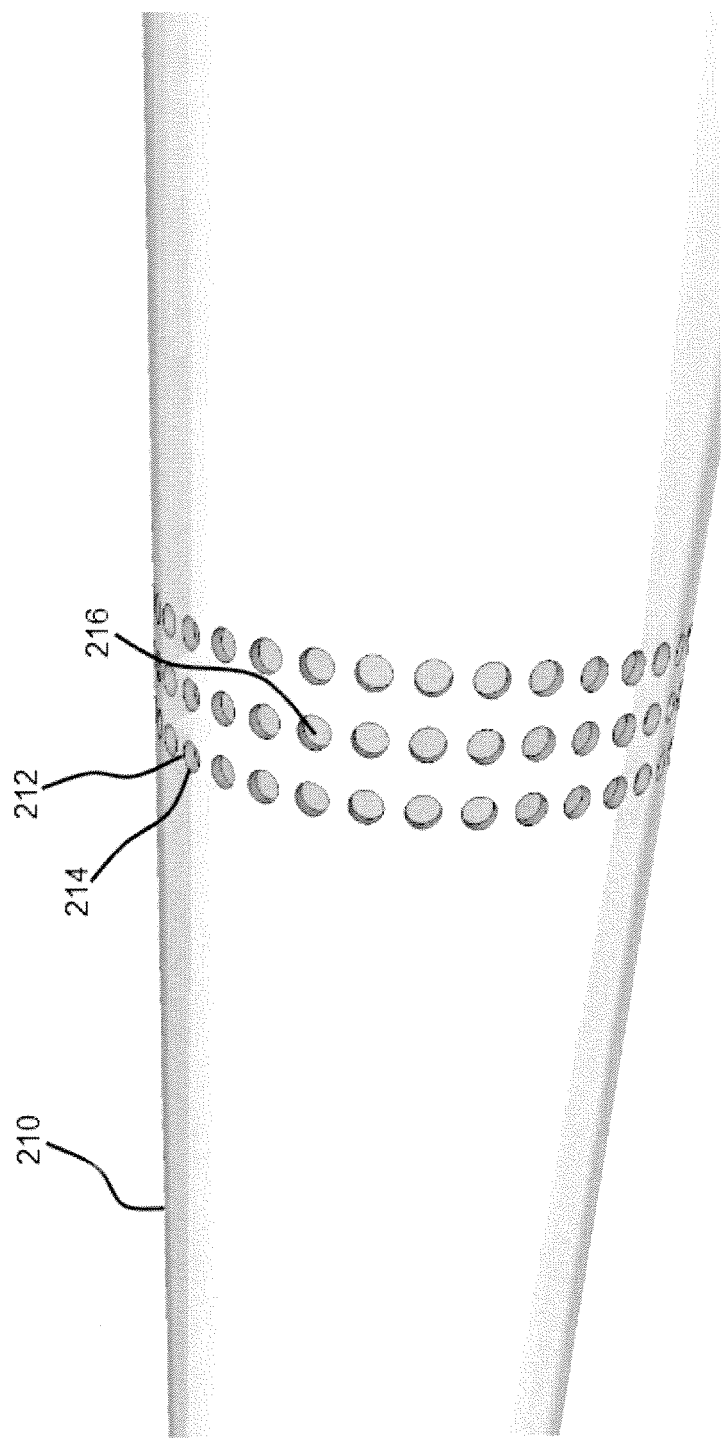
FIG. 39 is an isometric view of a surface drilled to accept an adhesive layer.

Looking to FIG. 39, a compromised or vulnerable section of pipe 210 is shown wherein instead of, or in combination with abrading the surface upon which the adhesive is to be applied, a plurality of blind holes 212 are provided. Blind holes generally comprise a side surface 214 and a bottom surface 216. Blind holes differ from through holes in the obvious difference that blind holes do not go all the way through the material into which they are drilled. In this application, blind holes allow for a very good adhesion to the pipe 210 without any concern of the adhesive passing through the holes and being disposed on the interior surface of the pipe 210.

This use of blind holes instead of, or in combination with abrasion, can be utilized in many of the applications disclosed herein.

Figure 40:
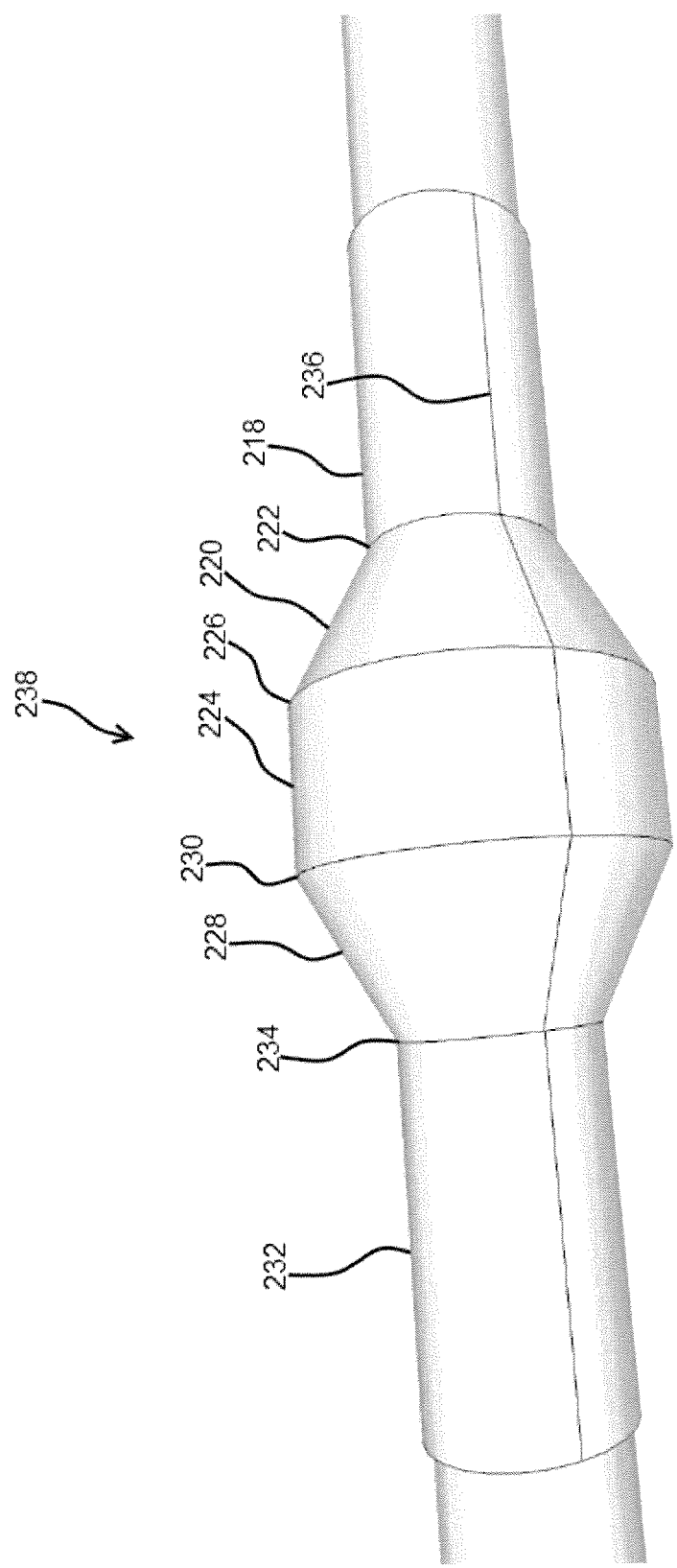
FIG. 40 is a side view of another method of repairing a compromised section of pipe.

Looking to FIG. 40, a new embodiment for repairing a compromised section of pipe or a fitting is shown. In this embodiment, the repair section comprises a first rigid sleeve 218 coupled to a first expansion portion 220, in one form, by way of a welded joint 222. The first expansion portion 220 extends from the first rigid sleeve 218 to a covering portion 224 and may be attached thereto by another welded seam 226. On the opposite side of the covering portion 224, a second expansion portion 228 is provided, which also may be attached by way of a welded seam 230. Again, the second expansion portion 228 may be attached to a second rigid sleeve 232 by way of a welded seam 234. As this entire apparatus needs to be disposed upon a pipe wherein the ends are not accessible, they may be comprised of split portions, or half circles, similar to that disclosed above and comprising a longitudinal seam 236. Of course, the upper and lower portion of the repair apparatus may be provided as a unitary structure, where the individual components are welded together in place upon the pipe.

Figure 41:
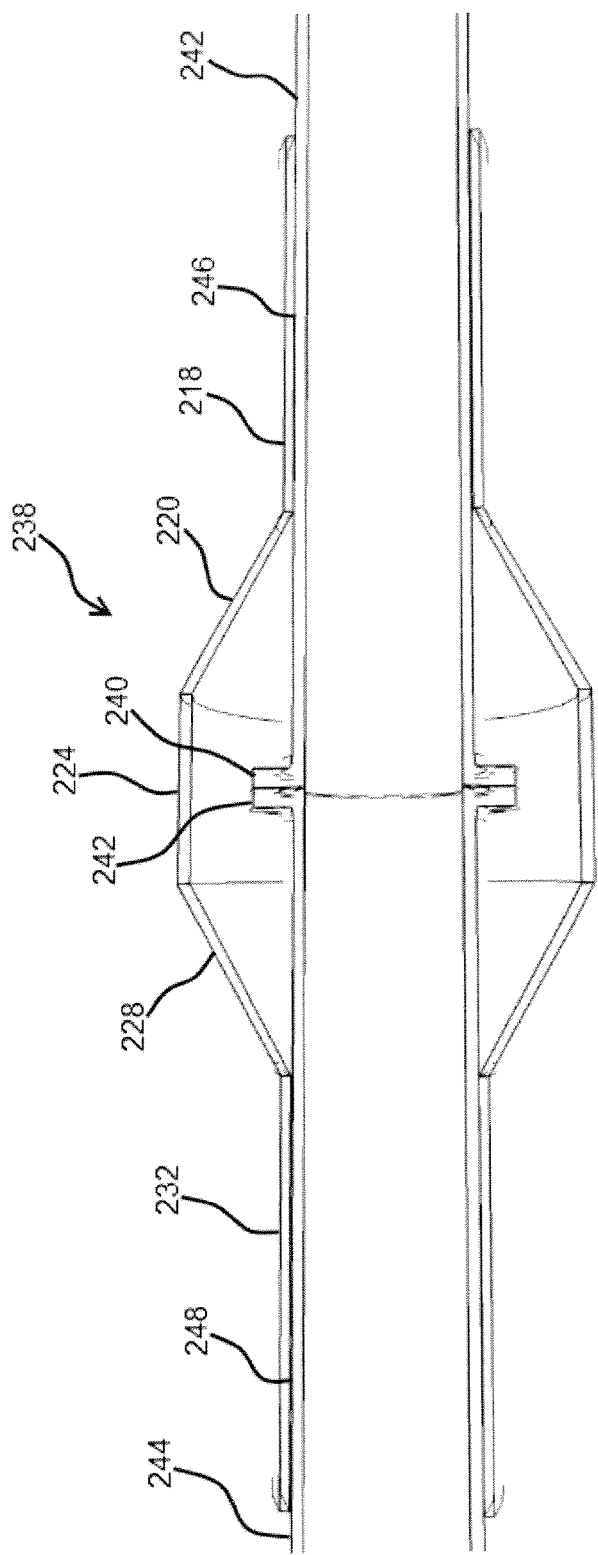
FIG. 41 is a cross sectional view of the embodiment of FIG. 40.

Looking to FIG. 41, it can be seen how the covering assembly in one form 238 fits over a first flange 240 and second flange 242. Of course, the covering assembly 238 can be utilized over pipe without any fitting, or may be utilized with fittings other than flanges. As with the above embodiment, the first rigid sleeve 218 and second rigid sleeve 232 are attached to the pipes 242 and 244, respectively, by way of an adhesive layer 246 and 248, respectively. This follows in accordance with the above embodiments.

This repair assembly can be used as a temporary fix before the pipe can be pressured down or alternatively could be a permanent installation.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

I claim:

1. A method for repairing a pipe having a compromised section, the repair system comprising:
   a. exposing the compromised section of the pipe;
   b. cleaning the surface of the pipe upon and adjacent the compromised section;
   c. drilling blind holes into at least a portion of the surface around the compromised section of the pipe;
   d. disposing at least one layer of adhesive upon the drilled surface;
   e. wherein the adhesive is comprised of a compound which cures to a semi-rigid state;
   f. disposing at least one layer of fibrous material upon the layer of adhesive exterior of the blind holes;
   g. wherein the layer of fibrous material comprises fibers; and
   h. wherein a portion of the adhesive is disposed between adjacent fibers of the material when cured.

2. The method for repairing a pipe as recited in claim 1 further comprising the step of abrading the surface around the blind holes prior to applying the layer of adhesive.

3. A method for repairing a pipe fitting comprising a vulnerable portion, the method for repairing the pipe fitting comprising the steps of:
   a. exposing at least a portion of the compromised pipe fitting;
   b. cleaning the surface of the area adjacent fitting on both the first and second sides of the fitting;
   c. disposing at least one layer of adhesive upon the surface of the vulnerable portion and the area of the pipe immediately there around on both sides of the fitting;
   d. wherein the adhesive is comprised of a compound which cures to a semi-rigid state;
   e. disposing a first rigid sleeve portion onto the adhesive of the first side of the fitting;
   f. disposing a second rigid sleeve portion onto the adhesive of the second side of the fitting;
   g. wherein the first and second sleeve portions are sealed to a first and a second expansion portion respectively;
   h. wherein the first and second expansion portions are sealed to and extend from the first and second sleeve portions, to a covering portion having an inner diameter sufficient to go around the pipe fitting.

* * * * *